United States Patent
Ding et al.

(10) Patent No.: US 10,548,113 B2
(45) Date of Patent: Jan. 28, 2020

(54) METHOD OF RESOURCE ALLOCATION FOR CHANNEL STATE INFORMATION FEEDBACK AND METHOD OF CHANNEL STATE INFORMATION FEEDBACK

(75) Inventors: Ming Ding, Shanghai (CN); Renmao Liu, Shanghai (CN); Yingyu Zhang, Shanghai (CN); Yongming Liang, Shanghai (CN); Zeng Yang, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 107 days.

(21) Appl. No.: 13/806,034

(22) PCT Filed: Apr. 4, 2011

(86) PCT No.: PCT/JP2011/058953
§ 371 (c)(1),
(2), (4) Date: Dec. 20, 2012

(87) PCT Pub. No.: WO2011/162008
PCT Pub. Date: Dec. 29, 2011

(65) Prior Publication Data
US 2013/0089064 A1 Apr. 11, 2013

(30) Foreign Application Priority Data
Jun. 21, 2010 (CN) .......................... 2010 1 0208030

(51) Int. Cl.
*H04W 72/04* (2009.01)
*H04B 7/06* (2006.01)

(52) U.S. Cl.
CPC .......... *H04W 72/04* (2013.01); *H04B 7/0626* (2013.01)

(58) Field of Classification Search
None
See application file for complete search history.

(56) References Cited

U.S. PATENT DOCUMENTS 8,995,373 B2 * 3/2015 Yang .................... H04B 7/0626
370/329
9,848,412 B2 * 12/2017 Yang .................... H04B 7/0626
(Continued)

FOREIGN PATENT DOCUMENTS

| WO | WO 97/48208 A1 | 12/1997 |
| WO | WO 2005/015774 A1 | 2/2005 |
| WO | WO 2008/069578 A1 | 6/2008 |

OTHER PUBLICATIONS

Huawei "Further design and evaluation on CSI-RS for CoMP" 3GPP Draft; R1-093841, 3GPP, Mobile Competence Centre; 650, Route Des Lucioles; F-06921 Sophia-Antipolis Cedex; France, no.Miyazaki; Oct. 12, 2009, XP050388348.
(Continued)

*Primary Examiner* — Christopher T Wyllie
(74) *Attorney, Agent, or Firm* — Birch, Stewart, Kolasch & Birch, LLP

(57) ABSTRACT

A method of resource allocation for Channel State Information (CSI) feedback is provided, which comprises the following steps of: configuring a downlink transmission approach and a feedback mode for each User Equipment (UE); allocating feedback resources required for CSI feedback by each UE based on the configured downlink transmission approach and feedback mode, such that different types underlying different feedback modes for a single UE will not collide with each other within one sub-frame; and notifying each UE of the corresponding configured downlink transmission approach and feedback mode and allocated feedback resources. Further, a method of Channel State Information (CSI) feedback is provided, which comprises the following steps of: feeding downlink CSI back to a base station (BS) based on a downlink transmission approach and a feedback mode configured by the BS; and solving, when
(Continued)

different types underlying different feedback modes collide with each other within one sub-frame, the collision based on a collision solution rule.

17 Claims, 3 Drawing Sheets

(56) References Cited

U.S. PATENT DOCUMENTS

| | | | |
|---|---|---|---|
| 2007/0171849 A1* | 7/2007 | Zhang | H04L 1/0026 370/310 |
| 2007/0207737 A1 | 9/2007 | Hui et al. | |
| 2008/0014942 A1* | 1/2008 | Umesh | H04W 36/0055 455/436 |
| 2009/0006925 A1* | 1/2009 | Pan | H04L 1/1861 714/758 |
| 2009/0023467 A1* | 1/2009 | Huang | H04B 7/0417 455/522 |
| 2009/0086706 A1 | 4/2009 | Huang et al. | |
| 2009/0130986 A1* | 5/2009 | Yun | H04L 1/0026 455/67.11 |
| 2010/0271970 A1* | 10/2010 | Pan | H04L 1/0026 370/252 |
| 2010/0303034 A1* | 12/2010 | Chen | H04L 5/0023 370/329 |
| 2011/0141928 A1* | 6/2011 | Shin | H04L 1/0028 370/252 |
| 2011/0242982 A1* | 10/2011 | Lunttila | H04L 5/001 370/241 |
| 2011/0249578 A1* | 10/2011 | Nayeb Nazar | H04L 1/0027 370/252 |
| 2011/0269492 A1* | 11/2011 | Wang | H04L 5/003 455/509 |
| 2012/0294268 A1* | 11/2012 | Lee | H03M 13/6525 370/329 |
| 2013/0128813 A1* | 5/2013 | Yang | H04B 7/0626 370/328 |
| 2013/0308484 A1* | 11/2013 | Lunttila | H04L 5/001 370/252 |
| 2015/0050941 A1* | 2/2015 | Sawada | H04W 36/06 455/452.2 |
| 2015/0085718 A1* | 3/2015 | Chen | H04B 7/2656 370/280 |
| 2017/0156152 A1* | 6/2017 | Nazar | H04L 1/0027 |
| 2018/0035425 A1* | 2/2018 | Yang | H04B 7/0626 |

OTHER PUBLICATIONS

3GPP TS 36.213 v9.1.0 (Mar. 2010), 3rd Generation Pertnership Project; Technical Specification Group Radio Access Network; Evolved Universal Terrestrial Radio Access (E-UTRA); Physical layer procedures (Release 9).
3GPP TS 36.213 V9.2.0 (Jun. 2010), 3rd Generation Pertnership Project; Technical Specification Group Radio Access Network; Evolved Universal Terrestrial Radio Access (E-UTRA), Physical layer procedures (Release 9).
3GPP TSG RAN WG1 Meeting #59, R1-094421, "Final Report of 3GPP TSG RAN WG1 #58bis v1.0.0(Miyazaki, Japan, Oct. 12-16, 2009)", Igenda Item 3, MCC Support, Nov. 9-13, 2009.
3GPP TSG RAN WG1 Meeting #60bis, R1-101808, "Evaluation of enhanced mimo feedbacks for LTE-A", Agenda Item: 6.3.4.2, Intel Corporation (UK) Ltd., Apr. 12-16, 2010.
3GPP TSG RAN WG1 Meeting #60bis, R1-102302, "CSI Feedback Enhancement for LTE-Advanced", Agenda Item: 6.3.4.2, NTT DOCOMO, Apr. 12-16, 2010.
3GPP TSG RAN WG1 Meeting #60bis, R1-102336, "Extending Rel-8/9 UE feedback for improved performance", Agenda Item: 6.3.4.2, Qualcomm Incorporated, Apr. 12-16, 2010.
3GPP TSG RAN WG1 Meeting #60bis, R1-102579, "Way forward on Rel. 10 feedback", RAN WG1, Agenda Item: 6.3.4.2 Apr. 12-16, 2010.
International Search Report, dated Jun. 14, 2011, issued in PCT/JP2011/058953.

* cited by examiner

METHOD OF RESOURCE ALLOCATION FOR CHANNEL STATE INFORMATION FEEDBACK AND METHOD OF CHANNEL STATE INFORMATION FEEDBACK

TECHNICAL FIELD

The invention relates to communication technology, and more particularly, to a technique for feedback of downlink Channel State Information (CSI) from a user equipment (UE) to a base station (BS) in a cell of a multi-antenna multi-carrier base station.

BACKGROUND ART

Multi-antenna wireless transmission technique, or Multiple Input Multiple Output (MIMO), can achieve spatial multiplex gain and spatial diversity gain by deploying a plurality of antennas at both the transmitter and the receiver and utilizing the spatial resources in wireless transmission. Researches on information theory have shown that the capacity of a MIMO system grows linearly with the minimum of the number of transmitting antennas and the number of receiving antennas.

FIG. 1 shows a schematic diagram of a MIMO system. As shown in FIG. 1, a plurality of antennas at the transmitter and a plurality of antennas at each of the receivers constitute a multi-antenna wireless channel containing spatial domain information. Further, Orthogonal Frequency Division Multiplexing (OFDM) technique has a strong anti-fading capability and high frequency utilization and is thus suitable for high speed data transmission in a multi-path and fading environment. The MIMO-OFDM technique, in which MIMO and OFDM are combined, has become a core technique for a new generation of mobile communication.

For instance, the $3^{rd}$ Generation Partnership Project (3GPP) organization is an international organization in mobile communication field which plays an important role in standardization of 3G cellular communication technologies. Since the second half of the year 2004, the 3GPP organization has initiated a so-called Long Term Evolution (LTE) project for designing Evolved Universal Terrestrial Radio Access (EUTRA) and Evolved Universal Terrestrial Radio Access Network (EUTRAN). The MIMO-OFDM technique is employed in the downlink of the LTE system. In a conference held in Shenzhen, China in April 2008, the 3GPP organization started a discussion on the standardization of 4G cellular communication systems (currently referred to as LTE-A systems). Again, the MIMO-OFDM technique becomes a key technique for air interface in the LTE-A system.

In the LTE-A system, Carrier Aggregation (CA) is a new concept. FIG. 2 illustrates the CA concept in which a base station is provided with a plurality of downlink carriers and a plurality of uplink carriers. A number of carriers can be virtually combined into one carrier, which is referred to as carrier aggregation. The LTE-A system can support continuous CA as well as intra-band or inter-band non-continuous CA, with a maximum aggregated bandwidth of 100 MHz. In order to ensure effective utilization of the carriers at the initial stage of the commercial deployment of the LTE-A system, i.e., to ensure that LTE UEs can access the LTE-A system, each carrier should be configured to be backward compatible with the LTE system. However, it is also possible to design a carrier dedicated to the LTE-A system. At the research stage of the LTE-A system, related researches on CA focus on improvement of spectral utilization for continuous CA, design of control channels for asymmetric uplink/downlink CA scenario, and the like. Herein, the design of control signals involves feedback of downlink CSI from a UE to a BS.

There are two feedback channels for downlink CSI feedback, a Physical Uplink Control CHannel (PUCCH) and a Physical Uplink Shared CHannel (PUSCH). In general, the PUCCH is configured for transmission of synchronized, basic CSI with low payload; while PUSCH is configured for transmission of bursty, extended CSI with high payload. For the PUCCH, a complete CSI is composed of different feedback contents which are transmitted in different sub-frames. For the PUSCH, on the other hand, a complete CSI is transmitted within one sub-frame. Such design principles remains applicable in the LTE-A system.

The feedback contents can be divided into three categories: Channel Quality Index (CQI), Pre-coding Matrix Index (PMI) and Rank Index (RI), all of which are bit quantized feedbacks. In the LTE-A system, these three categories of contents are still the primary feedback contents. For PMI, it is currently agreed that a PMI is collectively determined from two pre-coding matrix indices, W1 and W2, where W1 represents broadband/long-term channel characteristics and W2 represents sub-band/short-term channel characteristics. In transmission of W1 and W2 over the PUCCH, it is not necessary for simultaneous feedback of W1 and W2 within the same sub-frame. Moreover, W1 or W2 may be omitted in the feedback. This is described in 3GPP R1-102579, "Way forward on Rel. 10 feedback".

All the frequency areas corresponding to the CSI feedback are referred to as Set S. In the LTE system where there are only single-carrier situations, the Set S is defined as equal to the carrier bandwidth of the system. In the LTE-A system where there are additionally multi-carrier situations, the Set S can be defined as equal to the bandwidth of one single carrier or equal to the summed bandwidth of multiple carriers.

In the LTE system, the following eight types of MIMO transmission approaches for downlink data are defined:

1) Single antenna transmission. This is used for signal transmission at a single antenna BS. This approach is a special instance of MIMO system and can only transmit a single layer of data.

2) Transmission diversity. In a MIMO system, diversity effects of time and/or frequency can be utilized to transmit signals, so as to improve the reception quality of the signals. This approach can only transmit a single layer of data.

3) Open-loop space division multiplexing. This is a space division multiplexing without the need for PMI feedback from UE.

4) Closed-loop space division multiplexing. This is a space division multiplexing in which PMI feedback from UE is required.

5) Multi-user MIMO. There are multiple UEs simultaneously participating in the downlink communication of the MIMO system.

6) Closed-loop single layer pre-coding. Only one single layer of data is transmitted using the MIMO system. The PMI feedback from UE is required.

7) Beam forming transmission. The beam forming technique is employed in the MIMO system. A dedicated reference signal is used for data demodulation at UE. Only one single layer of data is transmitted using the MIMO system. The PMI feedback from UE is not required.

8) Two-layer beam forming transmission. The UE can be configured to feed back PMI and RI, or not to feed back PMI and RI.

In the LTE-A system, the above eight types of transmission approaches may be retained and/or canceled, and/or a new transmission approach, dynamic MIMO switching, can be added, by which the BS can dynamically adjust the MIMO mode in which the UE operates.

In order to support the above MIMO transmission approaches, a variety of CSI feedback modes are defined in the LTE system. Each MIMO transmission approach corresponds to a number of CSI feedback modes, as detailed in the following.

There are four CSI feedback modes for the PUCCH, Mode 1-0, Mode 1-1, Mode 2-0 and Mode 2-1. These modes are combination of four types of feedbacks, including:

1) Type 1: one preferred sub-band location in a Band Part (BP, which is a subset of the Set S and has its size dependent on the size of the Set S) and a CQI for the sub-band. The respective overheads are L bits for the sub-band location, 4 bits for the CQI of the first codeword and 3 bits for the CQI of the possible second codeword which is differentially coded with respect to the CQI of the first codeword.

2) Type 2: broadband CQI and PMI. The respective overheads are 4 bits for the CQI of the first codeword, 3 bits for the CQI of the possible second codeword which is differentially coded with respect to the CQI of the first codeword and 1, 2 or 4 bits for PMI depending on the antenna configuration at BS.

3) Type 3: RI. The overhead for RI is 1 bit for two antennas, or 2 bits for four antennas, depending on the antenna configuration at BS.

4) Type 4: broadband CQI. The overhead is constantly 4 bits.

The UE feeds back different information to the BS in correspondence with the above different types.

The Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back.

The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back.

The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

There are thus the following correspondence between the MIMO transmission approaches and the CSI feedback modes:

MIMO transmission approach 1): Mode 1-0 and Mode 2-0;

MIMO transmission approach 2): Mode 1-0 and Mode 2-0;

MIMO transmission approach 3): Mode 1-0 and Mode 2-0;

MIMO transmission approach 4): Mode 1-1 and Mode 2-1;

MIMO transmission approach 5): Mode 1-1 and Mode 2-1;

MIMO transmission approach 6): Mode 1-1 and Mode 2-1;

MIMO transmission approach 7): Mode 1-0 and Mode 2-0;

MIMO transmission approach 8): Mode 1-1 and Mode 2-1, with PMI/RI feedback from UE; and MIMO transmission approach 8): Mode 1-0 and Mode 2-0, without PMI/RI feedback from UE.

On the other hand, there are five CSI feedback modes for the PUSCH, Mode 1-2, Mode 3-0, Mode 3-1, Mode 2-0 and Mode 2-2.

In the Mode 1-2, the PMIs of the individual sub-bands in the Set S, the broadband CQIs of the individual sub-bands in the Set S and possibly the RI information are fed back.

In the Mode 3-0; the CQI for the first codeword of each, sub-band in the Set S, the broadband CQI of the first codeword in the Set S and possibly the RI information are fed back. Herein, the sub-band CQIs are differentially coded with respect to the broadband CQI, so as to reduce feedback overhead.

In the Mode 3-1, the CQIs for the individual codewords of each sub-band in the Set S, the broadband CQIs of the individual codewords in the Set S, the broadband PMI of the Set S and possibly the RI information are fed back. Herein, the sub-band CQIs are differentially coded with respect to the broadband CQIs, so as to reduce feedback overhead.

In the Mode 2-0, the locations of the preferred M sub-bands in the Set S, the broadband CQI for the first codeword in each of the M sub-bands, the broadband CQI of the first codeword in the Set S and possibly the RI information are fed back.

In the Mode 2-2, the locations of the preferred M sub-bands in the Set S, the broadband PMIs for the M sub-bands, the broadband CQIs for the individual codewords in each of the M sub-bands, the broadband PMI of the Set S, the broadband CQIs of the individual codewords in the Set S and possibly the RI information are fed back.

There are thus the following correspondence between the MIMO transmission approaches and the CSI feedback modes:

MIMO transmission approach 1): Mode 2-0 and Mode 2-0;

MIMO transmission approach 2): Mode 2-0 and Mode 3-0;

MIMO transmission approach 3): Mode 2-0 and Mode 3-0;

MIMO transmission approach 4): Mode 1-2, Mode 2-2 and Mode 3-1;

MIMO transmission approach 5): Mode 3-1;

MIMO transmission approach 6): Mode 1-2, Mode 2-2 and Mode 3-1;

MIMO transmission approach 7): Mode 2-0 and Mode 3-0;

MIMO transmission approach 8): Mode 1-2, Mode 2-2 and Mode 3-1, with PMI/RI feedback from UE; and MIMO transmission approach 8): Mode 2-0 and Mode 3-0, without PMI/RI feedback from UE.

There are currently few references available for the CSI feedback in the LTE-A system, as this has not been discussed in the standardization process. The only existing documents mainly focus on the general design of the feedback, including:

1) Fundamental principle for designing CSI feedback. The periodic feedback can support at most five downlink carriers and utilizes a design principle similar to that specified in Release 8 so as to map onto one uplink carrier for feedback. In addition, it is necessary to consider how to reduce the feedback overhead and how to increase the payload of the feedback channel. However, this fundamental design principle fails to teach any specific implementation, which is thus still a technical gap to be filled. Reference can be made to 3GPP RAN1, "Final Report of 3GPP TSG RAN WG1#58bis v1.0.0";

2) Frequency/time/spatial domain differential feedback. The UE performs differential process on the feedback information in frequency/time/spatial domain before feeding it back to the BS, so as to reduce feedback overhead. However, how to perform the differential feedback in an erroneous propagation and multi-carrier situation is still a problem to be researched. Reference can be made to 3GPPR1-101808, Intel Corporation, "Evaluation of enhanced MIMO feedbacks for LTE-A";

3) Feedback based on multifold characterization. For spatial domain CSI, multiple feedbacks can be carried out by means of quantization characterization from various perspectives. Reference can be made to 3GPP, R1-102336, "Extending Rel-8/9 UE feedback for improved performance", Qualcomm; and 4) Description of new problems on feedback over PUSCH and PUCCH. These problems include, among others, specific definitions for W1 and W2 in a two-codebook design; enhanced technique for feedback over non-periodic PUSCH; compression for feedback overhead. By far, there are no effective solutions for the above problems. Reference can be made to 3GPP, R1-102302, "CSI Feedback Enhancement for LTE-Advanced", NTT DOCOMO.

SUMMARY OF INVENTION

It is an object of the present invention to solve the problem of insufficient and inoperable feedback for downlink CSI in the prior art by providing a novel method of resource allocation for CSI feedback and method of CSI feedback.

According to the first solution of the present invention, a method of resource allocation for Channel State Information (CSI) feedback is provided, which comprises the following steps of: configuring a downlink transmission approach and a feedback mode for each User Equipment (UE); allocating feedback resources required for CSI feedback by each UE based on the configured downlink transmission approach and feedback mode, such that different types underlying different feedback modes for a single UE will not collide with each other within one sub-frame; and notifying each UE of the corresponding configured downlink transmission approach and feedback mode and allocated feedback resources.

Preferably, the feedback period of each type underlying a feedback mode for a single UE is a multiple of the feedback period of another type underlying another feedback mode; and the sub-frame offsets of different types underlying different feedback modes are different from one another.

More preferably, a same type underlying different feedback modes has a same sub-frame offset.

Preferably, for a single feedback mode, the sub-frame offset of a RI feedback is the same as the sub-frame offset of a CQI feedback.

According to the second solution of the present invention, a method of Channel State Information (CSI) feedback is provided, which comprises the following steps of: feeding downlink CSI back to a base station (BS) based on a downlink transmission approach and a feedback mode configured by the BS; and solving, when different types underlying different feedback modes collide with each other within one sub-frame, the collision based on a collision solution rule.

Preferably, the collision solution rule is defined as a type-prioritized rule in which a type with a longer period has a higher priority. When a collision occurs, a type with a high priority will be fed back while a type with a low priority will be discarded.

Preferably, the collision solution rule is defined as a mode-prioritized rule in which a mode with a lower feedback overhead has a higher priority. The priority of a mode is the priority of each type contained in the mode. When a collision occurs, a type with a high priority will be fed back while a type with a low priority will be discarded.

Preferably, the collision solution rule is defined as a mode-prioritized rule in which each mode has a pre-configured priority. The priority of a mode is the priority of each type contained in the mode. When a collision occurs, a type with a high priority will be fed back while a type with a low priority will be discarded.

Preferably, the collision solution rule is defined as a downlink primary carrier component-prioritized rule in which a mode for a downlink primary carrier component has a high priority. The priority of a mode is the priority of each type contained in the mode. When a collision occurs, a type with a high priority will be fed back while a type with a low priority will be discarded.

Preferably, the collision solution rule is defined as a content-prioritized rule in which a type carrying larger amount of information has a higher priority. When a collision occurs, a type with a high priority will be fed back while a type with a low priority will be discarded.

Preferably, a plurality of pieces of RI information is concatenated for transmission, without any coding process.

Preferably, a plurality of pieces of RI information is simultaneously transmitted after being subjected to a joint coding process.

More preferably, the joint coding process is an inter-mode differential coding process in which, with respect to the RI of a specified feedback mode as a reference, the RIs of the other feedback modes are differentially coded. Further, the specified feedback mode is a feedback mode for a downlink primary carrier component. Alternatively, the specified feedback mode is a feedback mode configured by the BS with upper layer signaling.

More preferably, the joint coding process is an inter-carrier differential coding process in which, with respect to the RI of the feedback mode for a specified carrier as a reference, the RIs of the other feedback modes are differentially coded. Further, the specified carrier is a downlink primary carrier component. Alternatively, the specified carrier is a carrier configured by the BS with upper layer signaling. Preferably, a plurality of pieces of broadband CQI information is simultaneously transmitted after being subjected to a joint coding process.

More preferably, the joint coding process is an inter-mode differential coding process in which, with respect to the CQI of a specified feedback mode as a reference, the CQIs of the other feedback modes are differentially coded. Further, the specified feedback mode is a feedback mode for a downlink primary carrier component. Alternatively, the specified feedback mode is a feedback mode configured by the BS with upper layer signaling.

More preferably, the joint coding process is an inter-carrier differential coding process in which, with respect to the CQI of the feedback mode for a specified carrier as a reference, the CQIs of the other feedback modes are differentially coded. Further, the specified carrier is a downlink primary carrier component. Alternatively, the specified carrier is a carrier configured by the BS with upper layer signaling.

Preferably, a plurality of types is concatenated for transmission, without any coding process.

Preferably, a plurality of types is simultaneously transmitted after being subjected to a joint coding process.

Preferably, a new type having the same period as Type 3 is defined for feedback of W1.

Preferably, a new type with its period being a multiple of the period of Type 2 or Type 4 is defined for feedback of W1.

Preferably, a new type with its period being a multiple of the period of Type 1 is defined for feedback of W1.

Preferably, a new type having the same feedback sub-frame offset as Type 2 or Type 4 is defined for feedback of W1.

Preferably, a new type having the same feedback sub-frame offset as Type 3 is defined for feedback of W1.

Preferably, one W1 is shared among a plurality of modes.

Preferably, one W1 is shared among a plurality of carriers. More preferably, said plurality of carriers is included in one transmission approach. Alternatively, said plurality of carriers is an arbitrary number of carriers out of all carriers.

Preferably, a plurality of W1s is aggregated into a single sub-frame for transmission.

Preferably, a new mode, Mode 2-2B, is defined, in which the locations of the preferred M sub-bands in the Set S, the sub-band PMIs for the M sub-bands, the sub-band CQIs for the individual codewords in each of the M sub-bands, the broadband PMI of the Set S, the broadband CQIs of the individual codewords in the Set S and possibly the RI information are fed back.

Preferably, a new mode, Mode 3-2, is defined, in which the sub-band PMIs for the individual sub-bands in the Set S, the CQIs for the individual codewords in each of the sub-bands in the Set S, the broadband CQIs of the individual codewords in the Set S, the broadband PMI of the Set S and possibly the RI information are fed back.

More preferably, a sub-band PMI is differentially coded with respect to the broadband PMI.

BRIEF DESCRIPTION OF DRAWINGS

The above and other objects, features and advantages of the present invention will be more apparent from the following preferred embodiments illustrated with reference to the figures, in which.

DESCRIPTION OF EMBODIMENTS

Preferred embodiments of the present invention will be detailed with reference to the drawings. In the following description, details and functions unnecessary to the present invention are omitted so as not to obscure the concept of the invention.

For clear and detailed explanation of the implementation steps of the present invention, some specific examples applicable to the LTE-A cellular communication system are given below. Herein, it is to be noted that the present invention is not limited to the application exemplified in the embodiments. Rather, it is applicable to other communication systems, such as the future 5G system.

Figure 1:
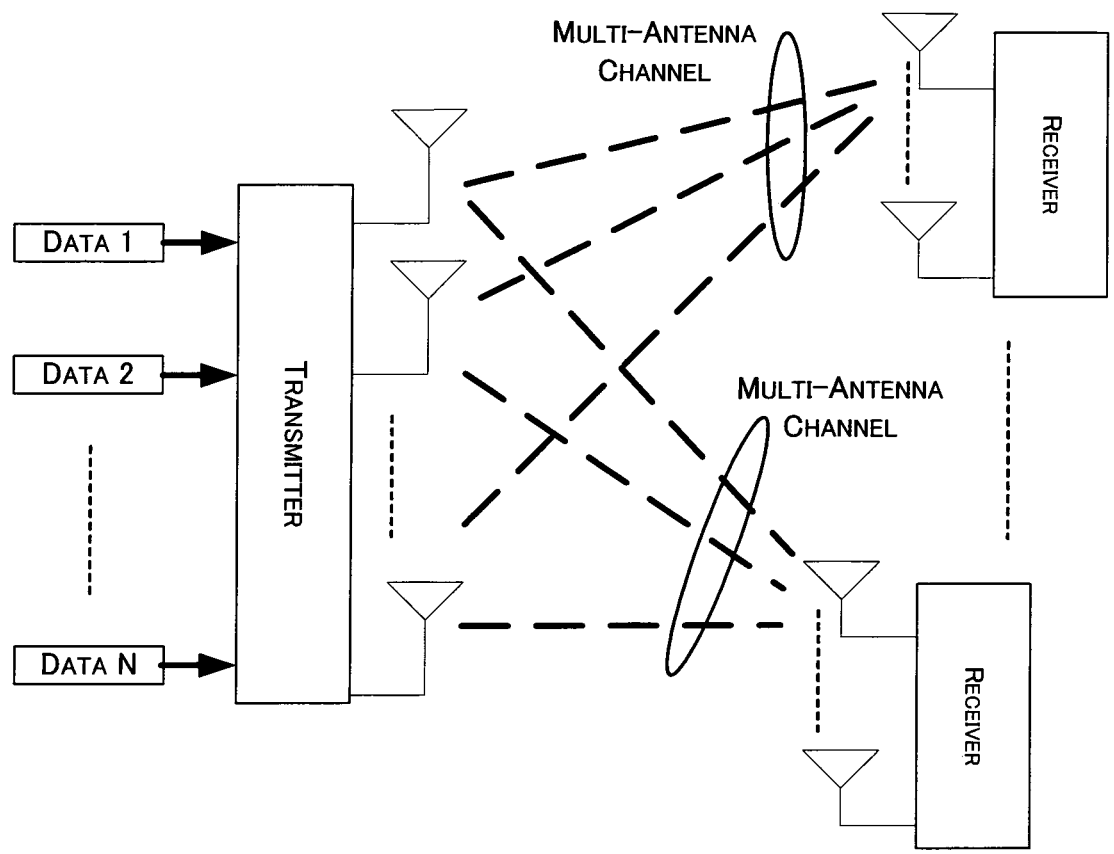
FIG. 1 is a schematic diagram of a MIMO system.
Figure 2:
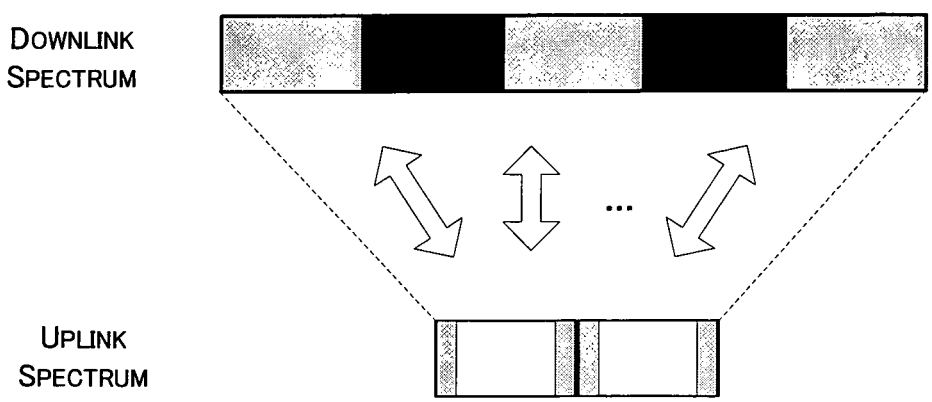
FIG. 2 is a schematic diagram of carrier aggregation.
Figure 3:
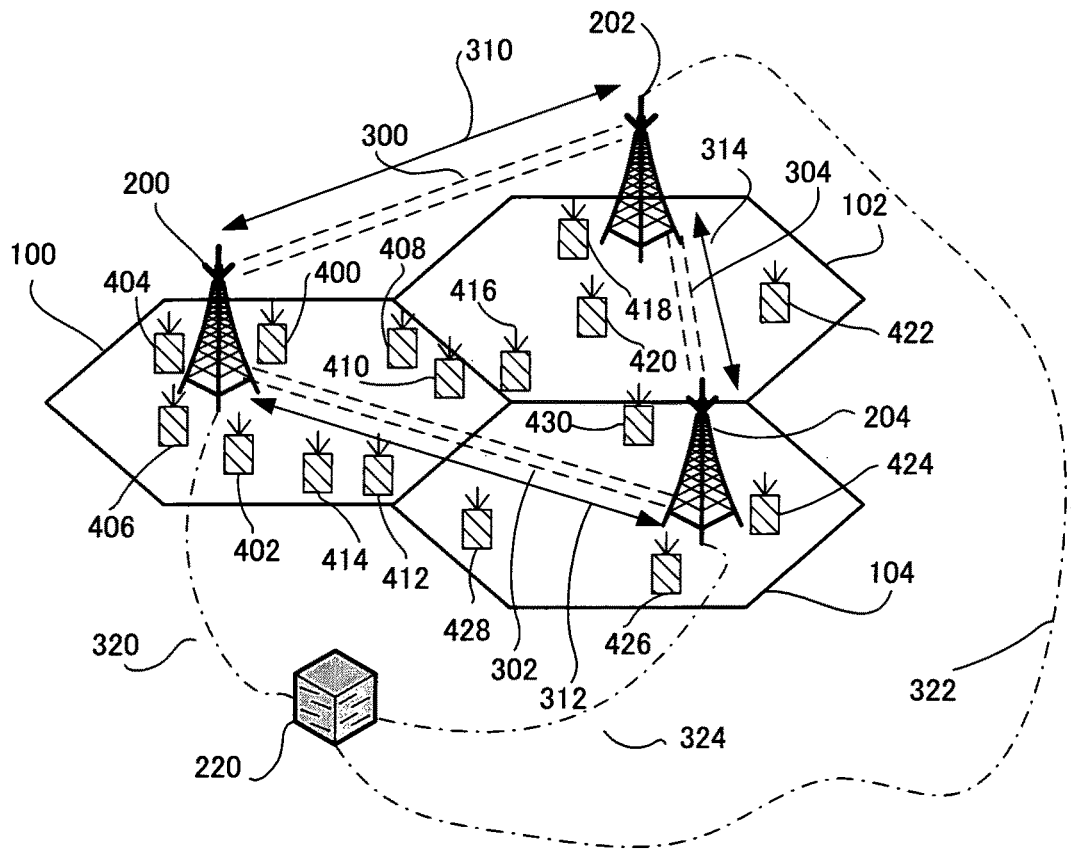
FIG. 3 is a schematic diagram of a multi-cell cellular communication system.

FIG. 3 is a schematic diagram of a multi-cell cellular communication system. The cellular system divides a service coverage area into a number of adjacent wireless coverage areas, i.e., cells. In FIG. 3, the entire service area is formed by cells 100, 102 and 104, each being illustratively shown as a hexagon. Base Stations (BSs) 200, 202 and 204 are associated with the cells 100, 102 and 104, respectively. As known to those skilled in the art, each of the BSs 200-204 comprises at least a transmitter and a receiver. Herein, it is to be noted that a BS, which is generally a serving node in a cell, can be an independent BS having a function of resource scheduling, a transmitting node belonging to an independent BS, a relay node (which is generally configured for further enlarging the coverage of a cell), or the like. As illustratively shown in FIG. 3, each of the BSs 200-204 is located in a particular area of the corresponding one of the cells 100-104 and is equipped with an omni-directional antenna. However, in a cell arrangement for the cellular communication system, each of the BSs 200-204 can also be equipped with a directional antenna for directionally covering a partial area of the corresponding one of the cells 100-104, which is commonly referred to as a sector. Thus, the diagram of the multi-cell cellular communication system as shown in FIG. 3 is illustrative only and does not imply that the implementation of the cellular system according to the present invention is limited to the above particular constraints.

As shown in FIG. 3, the BSs 200-204 are connected with each other via X2 interfaces 300, 302 and 304. In a LTE system, a three-layer node network architecture including base station, radio network control unit and core network is simplified into a two-layer node architecture in which the function of the radio network control unit is assigned to the base station and a wired interface named "X2" is defined for coordination and communication between base stations.

In FIG. 3, the BSs 200-204 are also connected with each other via air interfaces, A1 interfaces, 310, 312 and 314. In a future communication system, it is possible to introduce a concept of relay node. Relay nodes are connected with each other via wireless interfaces and a base station can be considered as a special relay node. Thus, a wireless interface named "A1" can then be used for coordination and communication between base stations.

Additionally, an upper layer entity 220 of the BSs 200-204 is also shown in FIG. 3, which can be a gateway or another network entity such as mobility management entity. The upper layer entity 220 is connected to the BSs 200-204 via S1 interfaces 320, 322 and 324, respectively. In a LTE system, a wired interface named "S1" is defined for coordination and communication between the upper layer entity and the base station.

A number of User Equipments (UEs) 400-430 are distributed over the cells 100-104, as shown in FIG. 3. As known to those skilled in the art, each of the UEs 400-430 comprises a transmitter, a receiver and a mobile terminal control unit. Each of the UEs 400-430 can access the cellular communication system via its serving BS (one of the BSs 200-204). It should be understood that while only 16 UEs are illustratively shown in FIG. 3, there may be a large number of UEs in practice. In this sense, the description of the UEs in FIG. 3 is also for illustrative purpose only. Each of the UEs 400-430 can access the cellular communication network via its serving BS. The BS directly providing communication service to a certain UE is referred to as the serving BS of that UE, while other BSs are referred to non-serving BSs of that UE. The non-serving BSs can function as cooperative BSs of the serving BS and provide communication service to the UE along with the serving BS.

For explanation of this embodiment, the UE 416 equipped with 2 receiving antennas is considered. The UE 416 has BS 202 as its serving BS and has BSs 200 and 204 as its non-serving BSs. It is to be noted that this embodiment focuses on the UE 416, which does not imply that the present invention is only applicable to one UE scenario. Rather, the present invention is fully applicable to multi-UE scenario. For example, the inventive method can be applied to the UEs 408, 410, 430 and the like as shown in FIG. 3.

Moreover, according to 3GPP document TS36.213 V9.1.0, "Physical layer procedures", for a downlink LTE system with a bandwidth of 20 MHz, there are around 96 spectral resource blocks in the frequency domain, in addition to a control signaling area. According to a definition, these spectral resource blocks are sorted in a descending order in terms of frequency. Every eight consecutive spectral resource blocks are referred to as a sub-band. Thus, there are around 12 sub-bands. It is to be noted that the above definition of sub-band, which is compliant with standardized protocols, is exemplified for explaining the embodiments of the present invention. The application of the present invention is not limited to the above definition and is fully applicable to other definitions. By reading the embodiments of the present invention, those skilled in the art can understand that the solution of the present invention is applicable to a general definition of sub-band.

Figure 4:
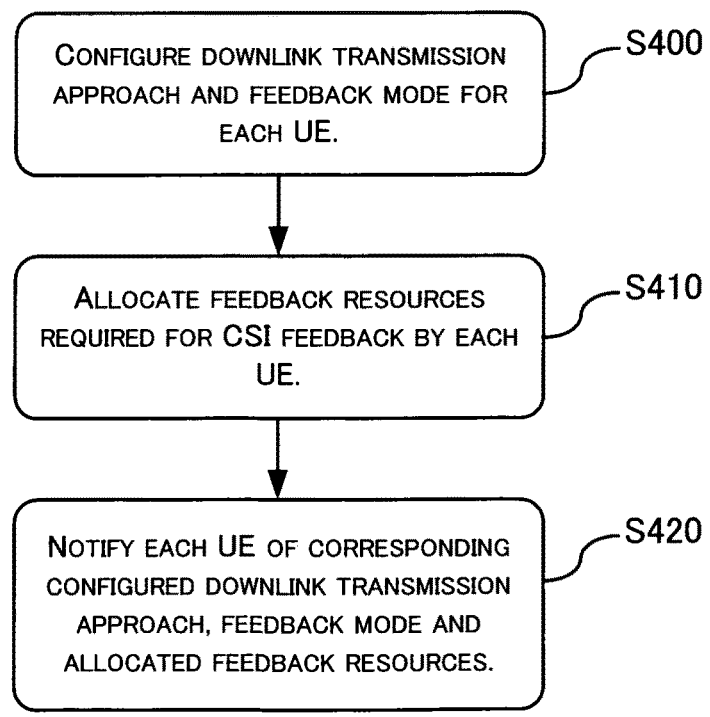
FIG. 4 is a flowchart illustrating the method of resource allocation for CSI feedback according to the present invention.

FIG. 4 is a flowchart illustrating the method of resource allocation for CSI feedback according to the present invention.

As shown in FIG. 4, the method of resource allocation for CSI feedback according to the present invention comprises the following steps. At step S400, a downlink transmission approach and a feedback mode for each UE are configured. At step S410, feedback resources required for CSI feedback by each UE are allocated based on the configured downlink transmission approach and feedback mode, such that different types underlying different feedback modes for a single UE will not collide with each other within one sub-frame. At step S420, each UE is notified of the corresponding configured downlink transmission approach and feedback mode and allocated feedback resources.

In order to prevent different types underlying different feedback modes for a single UE from colliding with each other within one sub-frame, the feedback period of each type underlying a feedback mode for a single UE can be set as a multiple of the feedback period of another type underlying another feedback mode, and the sub-frame offsets of different types underlying different feedback modes can be different from one another.

In addition, a same type underlying different feedback modes has a same sub-frame offset.

In addition, for a single feedback mode, the sub-frame offset of a RI feedback is the same as the sub-frame offset of a CQI feedback.

Figure 5:
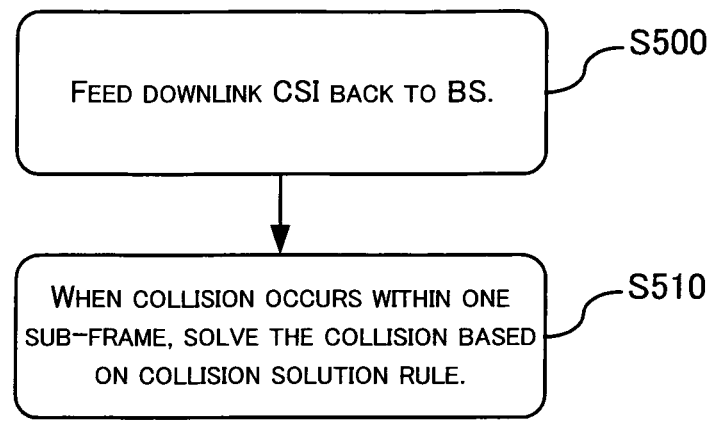
FIG. 5 is a flowchart illustrating the method of CSI feedback according to the present invention.

FIG. 5 is a flowchart illustrating the method of CSI feedback according to the present invention.

As shown in FIG. 5, the method of CSI feedback according to the present invention comprises the following steps. At step S500, downlink CSI is fed back to a base station (BS) based on a downlink transmission approach and a feedback mode configured by the BS. At step S510, when different types underlying different feedback modes collide with each other within one sub-frame, the collision is solved based on a collision solution rule.

For example, the collision solution rule can be defined as a type-prioritized rule in which a type with a longer period has a higher priority. When a collision occurs, a type with a high priority will be fed back while a type with a low priority will be discarded.

Alternatively, the collision solution rule can be defined as a mode-prioritized rule in which a mode with a lower feedback overhead has a higher priority. The priority of a mode is the priority of each type contained in the mode. When a collision occurs, a type with a high priority will be fed back while a type with a low priority will be discarded.

Alternatively, the collision solution rule can be defined as a mode-prioritized rule in which each mode has a pre-configured priority. The priority of a mode is the priority of each type contained in the mode. When a collision occurs, a type with a high priority will be fed back while a type with a low priority will be discarded.

Alternatively, the collision solution rule can be defined as a downlink primary carrier component-prioritized rule in which a mode for a downlink primary carrier component has a high priority. The priority of a mode is the priority of each type contained in the mode. When a collision occurs, a type with a high priority will be fed back while a type with a low priority will be discarded.

Alternatively, the collision solution rule can be defined as a content-prioritized rule in which a type carrying larger amount of information has a higher priority. When a collision occurs, a type with a high priority will be fed back while a type with a low priority will be discarded.

Additionally, a plurality of pieces of RI information can be concatenated for transmission, without any coding process.

As an alternative, a plurality of pieces of RI information can be simultaneously transmitted after being subjected to a joint coding process.

For example, the joint coding process is an inter-mode differential coding process in which, with respect to the RI of a specified feedback mode as a reference, the RIs of the other feedback modes are differentially coded. Further, the specified feedback mode is a feedback mode for a downlink primary carrier component. Alternatively, the specified feedback mode is a feedback mode configured by the BS with upper layer signaling.

As an alternative, the joint coding process is an inter-carrier differential coding process in which, with respect to the RI of the feedback mode for a specified carrier as a reference, the RIs of the other feedback modes are differentially coded. Further, the specified carrier is a downlink primary carrier component. Alternatively, the specified carrier is a carrier configured by the BS with upper layer signaling.

Additionally, a plurality of pieces of broadband CQI information can be simultaneously transmitted after being subjected to a joint coding process.

For example, the joint coding process can be an inter-mode differential coding process in which, with respect to the CQI of a specified feedback mode as a reference, the CQIs of the other feedback modes are differentially coded. Further, the specified feedback mode is a feedback mode for a downlink primary carrier component. Alternatively, the specified feedback mode is a feedback mode configured by the BS with upper layer signaling.

As an alternative, the joint coding process is an inter-carrier differential coding process in which, with respect to the CQI of the feedback mode for a specified carrier as a reference, the CQIs of the other feedback modes are differentially coded. Further, the specified carrier is a downlink primary carrier component. Alternatively, the specified carrier is a carrier configured by the BS with upper layer signaling.

Additionally, a plurality of types can be concatenated for transmission, without any coding process.

As an alternative, a plurality of types can be simultaneously transmitted after being subjected to a joint coding process.

On the other hand, a new type having the same period as Type 3 can be defined for feedback of W1.

As an alternative, a new type with its period being a multiple of the period of Type 2 or Type 4 can be defined for feedback of W1.

As an alternative, a new type with its period being a multiple of the period of Type 1 can be defined for feedback of W1.

Additionally, a new type having the same feedback sub-frame offset as Type 2 or Type 4 can be defined for feedback of W1.

As an alternative, a new type having the same feedback sub-frame offset as Type 3 can be defined for feedback of W1.

According to the present invention, one W1 is shared among a plurality of modes.

According to the present invention, one W1 is shared among a plurality of carriers. For example, said plurality of carriers is included in one transmission approach. Alternatively, said plurality of carriers is an arbitrary number of carriers out of all carriers.

According to the present invention, a plurality of W1s can be aggregated into a single sub-frame for transmission.

Additionally, a new mode, Mode 2-2B, can be defined, in which the locations of the preferred M sub-bands in the Set S, the sub-band PMIs for the M sub-bands, the sub-band CQIs for the individual codewords in each of the M sub-bands, the broadband PMI of the Set S, the broadband CQIs of the individual codewords in the Set S and possibly the RI information are fed back.

Additionally, a new mode, Mode 3-2, can be defined, in which the sub-band PMIs for the individual sub-bands in the Set. S, the CQIs for the individual codewords in each of the sub-bands in the Set S, the broadband CQIs of the individual codewords in the Set S, the broadband PMI of the Set. S and possibly the RI information are fed back.

According to the new Mode 2-2B or 3-2 as defined, a sub-band PMI is differentially coded with respect to the broadband PMI.

In description of the embodiment, the following scenario of transmission approaches and feedback modes is assumed.

Exemplary Scenario (a): the BS 202 is equipped with five downlink carriers and adapted to configure the feedback by the UE 416 according to transmission approaches. That is, the transmission approach for carriers #1 and #2 is "8) two-layer beam forming transmission with PMI/RI feedback" and the corresponding Set S contains the carriers #1 and #2. In addition, the transmission approach for carriers #3, #4 and #5 is "3) open-loop space division multiplexing" and the corresponding Set S contains the carriers #3, #4 and #5. Herein, the carrier #2 is a DownLink Primary Carrier Component (DLPCC).

Exemplary Scenario (b): the BS 202 is equipped with five downlink carriers and adapted to configure the feedback by the UE 416 according to transmission approaches. That is, the transmission approach for carrier #1 is "8) two-layer beam forming transmission with PMI/RI feedback" and the corresponding Set S contains the carrier #1. The transmission approach for carrier #2 is "4) closed-loop space division multiplexing" and the corresponding Set S contains the carrier #2. The transmission approach for carrier #3 is "2) transmission diversity" and the corresponding Set S contains the carrier #3. The transmission approach for carrier #4 is "2) transmission diversity" and the corresponding Set S contains the carrier #4. Finally, the transmission approach for carrier #5 is "5) multi-user MIMO" and the corresponding Set S contains the carrier #5. Herein, the carrier #1 is a DownLink Primary Carrier Component (DLPCC).

It is to be noted that the conditions assumed in the exemplary scenarios are illustrated for the purpose of explaining the embodiments of the present invention only. The present invention is not limited to the above assumption and is fully applicable to other assumptions. By reading the embodiments of the present invention, those skilled in the art can understand that the solution of the present invention is also applicable to a general situation.

Next, 28 application examples will be given in this embodiment.

EXAMPLE 1(a)

In the case of a periodic feedback, it is proposed to prevent different types underlying different feedback modes for a single UE from colliding with each other within one sub-frame by allocation of feedback resources. In this example, for all the feedback modes, the feedback period for each type is a multiple of the feedback period for another type. Further, different types underlying different feedback modes have different sub-frame offsets. In this way, it is possible to prevent different types underlying different feedback modes from colliding with each other within one sub-frame. Additionally, for a single feedback mode, the sub-frame offset of a RI feedback can be the same as the sub-frame offset of a CQI feedback.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual, codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

In order to prevent different types underlying different feedback modes from colliding with each other within one sub-frame, it is required that, for all the feedback modes, the feedback period of each type is a multiple of the feedback period of another type and different types underlying different feedback modes have different sub-frame offsets. In other words, $N_P^{(1)}$ is a multiple of $N_P^{(2)}$ or vise versa; and $N_{OFFSET,CQI}^{(1)}$ is different from $N_{OFFSET,CQI}^{(2)}$.

In addition, in this configuration, it is possible that, the same type underlying different feedback modes can have the same sub-frame offset.

Further, in this configuration, it is possible that, for a single feedback mode, the sub-frame offset for the RI feedback is the same as the sub-frame offset for the CQI offset. That is, $N_{OFFSET,RI}^{(1)}$ and $N_{OFFSET,RI}^{(2)}$ can be zero.

EXAMPLE 1(b)

In the case of a periodic feedback, it is proposed to prevent different types underlying, different feedback modes for a single UE from colliding with each other within one sub-frame by allocation of feedback resources. In this example, for all the feedback modes, the feedback period for each type is a multiple of the feedback period for another type. Further, different types underlying different feedback modes have different sub-frame offsets. In this way, it is possible to prevent different types underlying different feedback modes from colliding with each other within one sub-frame. Additionally, for a single feedback mode, the sub-frame offset of a RI feedback can be the same as the sub-frame offset of a CQI feedback.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2)transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$; and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

In order to prevent different types underlying different feedback modes from colliding with each other within one sub-frame, it is required that, for all the feedback modes, the feedback period of each type is a multiple of the feedback period of another type and different types underlying different feedback modes have different sub-frame offsets. In other words, each of $N_P^{(1)}$, $N_P^{(2)}$, $N_P^{(3)}$, $N_P^{(4)}$ and $N_P^{(5)}$ can be a multiple of another; and $N_{OFFSET,CQI}^{(1)}$, $N_{OFFSET,CQI}^{(2)}$, $N_{OFFSET,CQI}^{(3)}$, $N_{OFFSET,CQI}^{(4)}$ and $N_{OFFSET,CQI}^{(5)}$ are different from each other.

In addition, in this configuration, it is possible that, the same type underlying different feedback modes can have the same sub-frame offset.

Further, in this configuration, it is possible that, for a single feedback mode, the sub-frame offset for the RI feedback is the same as the sub-frame offset for the CQI offset. That is, each of $N_{OFFSET,RI}^{(1)}$, $N_{OFFSET,RI}^{(2)}$, $N_{OFFSET,RI}^{(3)}$, $N_{OFFSET,RI}^{(4)}$ and $N_{OFFSET,RI}^{(5)}$ can be zero.

EXAMPLE 2(a)

In the case of a periodic feedback, it is proposed to prevent different types underlying different feedback modes for a single UE from colliding with each other within one sub-frame by defining a collision solution rule. In this example, the collision solution rule is defined as a type-prioritized rule in which a type with a longer period has a higher priority. When a collision occurs, a type with a high priority will be fed back while a type with a low priority will be discarded.

The above Exemplary Scenario (a) is assumed in this example. According to the 3GPP document TS36.213 V9.1.0, "Physical layer procedures", the transmission approach for the carriers #1 and #2 is assumed to be "8)

two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \bmod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \bmod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \bmod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \bmod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \bmod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

The feedback types underlying the Mode 1-1 and the Mode 2-0 can be prioritized with respect to the lengths of their periods, wherein a type with a longer period has a higher priority. Thus, the following rule can be defined: when a collision occurs, a type with a high priority will be fed back while a type with a low priority will be discarded. For example, when the Type 3 underlying the Mode 2-0 collides with the Type 2 underlying the Mode 1-1, if the period of the Type 3 underlying the Mode 2-0, $H^{(2)} \cdot N_P^{(2)} \cdot M_{RI}^{(2)}$, is longer than the period of the Type 2 underlying the Mode 1-1, the Type 3 underlying the Mode 2-0 will override the Type 2 underlying the Mode 1-1. In other words, when such a collision occurs, only the Type 3 underlying the Mode 2-0 will be transmitted, while the Type 2 underlying the Mode 1-1 will be discarded.

It is to be noted that, feedback types with the same feedback period will not collide with each other in general. Once occurred, such a collision will always occur due to the same period. Thus, such a configuration is generally disallowed by the BS. Therefore, it is generally not necessary to define a collision solution rule for types having the same feedback period and thus the same priority.

EXAMPLE 2(b)

In the case of a periodic feedback, it is proposed to prevent different types underlying different feedback modes for a single UE from colliding with each other within one sub-frame by defining a collision solution rule. In this example, the collision solution rule is defined as a type-prioritized rule in which a type with a longer period has a higher priority. When a collision occurs, a type with a high priority will be fed back while a type with a low priority will be discarded.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \bmod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \bmod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier. #2 satisfy:

$$(10 \times n_f + \lfloor n_s/2 \rfloor - N_{OFFSET,CQI}^{(2)} - N_{OFFSET,RI}^{(2)}) \bmod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \bmod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \bmod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \bmod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \bmod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \bmod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \bmod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \bmod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \bmod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \bmod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

The feedback types underlying the Mode 1-1 for the carrier #1, the Mode 2-1 for the carrier #2, the Mode 1-0 for the carrier #3, the Mode 2-0 for the carrier #4 and the Mode 1-1 for the carrier #5 can be prioritized with respect to the lengths of their periods, wherein a type with a longer period has a higher priority. Thus, the following rule can be defined: when a collision occurs, a type with a high priority will be fed back while a type with a low priority will be discarded. For example, when the Type 4 underlying the Mode 1-0 for the carrier #3 collides with the Type 3 underlying the Mode 1-1 for the carrier #5, if the period of the Type 4 underlying the Mode 1-0 for the carrier. #3 is shorter than the period of the Type 3 underlying the Mode 1-1 for the carrier #5, the Type 3 underlying the Mode 1-1 for the carrier #5 will override the Type 4 underlying the Mode 1-0 for the carrier #3. In other words, when such a collision occurs, only the Type 3 underlying the Mode 1-1 for the carrier #5 will be transmitted, while the Type 4 underlying the Mode 1-0 for the carrier #3 will be discarded.

It is to be noted that, feedback types with the same feedback period will not collide with each other in general. Once occurred, such a collision will always occur due to the same period. Thus, such a configuration is generally disallowed by the BS. Therefore, it is generally not necessary to define a collision solution rule for types having the same feedback period and thus the same priority.

EXAMPLE 3(a)

In the case of a periodic feedback, it is proposed to prevent different types underlying different feedback modes for a single UE from colliding with each other within one sub-frame by defining a collision solution rule. In this example, the collision solution rule is defined as a mode-prioritized rule in which a mode with a lower feedback overhead has a higher priority. When a collision occurs, a type with a high priority will be fed back while a type with a low priority will be discarded.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(3)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

The feedback types underlying the Mode 1-1 and the Mode 2-0 can be prioritized with respect to their feedback overheads, wherein a type with a lower feedback overhead has a higher priority. Thus, the following rule can be defined: when a collision occurs, a type with a high priority will be fed back while a type with a low priority will be discarded. For example, the Mode 1-1 has a lower feedback overhead than the Mode 2-0. Thus, a type underlying the Mode 1-1 has a higher priority than a type underlying the Mode 2-0. In this case, when the Type 3 underlying the Mode 2-0 collides with the Type 2 underlying the Mode 1-1, the Type 2 underlying the Mode 1-1 will override the Type 3 underlying the Mode 2-0. In other words, when such a collision occurs, only the Type 2 underlying the Mode 1-1 will be transmitted, while the Type 3 underlying the Mode 2-0 will be discarded.

EXAMPLE 3(b)

In the case of a periodic feedback, it is proposed to prevent different types underlying different feedback modes for a single UE from colliding with each other within one sub-frame by defining a collision solution rule. In this example, the collision solution rule is defined as a mode-prioritized rule in which a mode with a lower feedback overhead has a higher priority. When a collision occurs, a type with a high priority will be fed back while a type with a low priority will be discarded.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

The feedback types underlying the Mode 1-1 for the carrier #1, the Mode 2-1 for the carrier #2, the Mode 1-0 for the carrier. #3, the Mode 2-0 for the carrier #4 and the Mode 1-1 for the carrier #5 can be prioritized with respect to their feedback overheads, wherein a type with a lower feedback overhead has a higher priority. Thus, the following rule can be defined: when a collision occurs, a type with a high priority will be fed back while a type with a low priority will be discarded. For example, the Mode 1-0 for the carrier #3 has a lower feedback overhead than the Mode 2-0 for the carrier #4. Thus, a type underlying the Mode 1-0 for the carrier #3 has a higher priority than a type underlying the Mode 2-0 for the carrier #4. In this case, when the Type 3 underlying the Mode 2-0 for the carrier #4 collides with the Type 4 underlying the Mode 1-0 for the carrier #3, the Type 4 underlying the Mode 1-0 for the carrier #3 will override the Type 3 underlying the Mode 2-0 for the carrier #4. In other words, when such a collision occurs, only the Type 4 underlying the Mode 1-0 for carrier #3 will be transmitted, while the Type 3 underlying the Mode 2-0 for the carrier #4 will be discarded.

EXAMPLE 4(a)

In the case of a periodic feedback, it is proposed to prevent different types underlying different feedback modes for a single UE from colliding with each other within one sub-frame by defining a collision solution rule. In this example, the collision solution rule is defined as a mode-prioritized rule in which each mode has a configured priority. When a collision occurs, a type with a high priority will be fed back while a type with a low priority will be discarded. In this example, the configuration of the priorities of modes can be carried out by the BS. In a future communication system, the configuration of the priorities of modes can be carried out by a UE with enhanced processing capabilities and then notified to the BS.

The above Exemplary Scenario (a) is assumed in this example. According to the 3GPP document TS36.213 V9.1.0,"Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0$ for Type 3, and $(10 \times n_f + \lfloor n_s/2 \rfloor - N_{OFFSET,CQI}^{(1)}) \mod N_P^{(1)} = 0$ for Type 2, respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$; and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0$ for Type 3, and $(10 \times n_f + \lfloor n_s/2 \rfloor - N_{OFFSET,CQI}^{(2)}) \mod(H^{(2)} \cdot N_P^{(2)}) = 0$ for Type 4, and $(10 \times n_f + \lfloor n_s/2 \rfloor - N_{OFFSET,CQI}^{(2)}) \mod N_P^{(2)} = 0$ for Type 1, respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

The priorities of the Mode 1-1 and the Mode 2-0 can be configured by the BS. In this way, the following rule can be defined: when a collision occurs, a type with a high priority will be fed back while a type with a low priority will be discarded. For example, as configured by the BS, a type underlying the Mode 1-1 has a higher priority than a type underlying the Mode 2-0. In this case, when the Type 3 underlying the Mode 2-0 collides with the Type 2 underlying the Mode 1-1, the Type 2 underlying the Mode 1-1 will override the Type 3 underlying the Mode 2-0. In other words, when such a collision occurs, only the Type 2 underlying the Mode 1-1 will be transmitted, while the Type 3 underlying the Mode 2-0 will be discarded.

EXAMPLE 4(b)

In the case of a periodic feedback, it is proposed to prevent different types underlying different feedback modes for a single UE from colliding with each other within one sub-frame by defining a collision solution rule. In this example, the collision solution rule is defined as a mode-prioritized rule in which each mode has a configured priority. When a collision occurs, a type with a high priority will be fed back while a type with a low priority will be discarded. In this example, the configuration of the priorities of modes can be carried out by the BS. In a future communication system, the configuration of the priorities of modes can be carried out by a UE with enhanced processing capabilities and then notified to the BS.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4)

closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \bmod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \bmod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \bmod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \bmod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \bmod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier. #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \bmod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \bmod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \bmod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \bmod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \bmod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \bmod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \bmod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset: for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

The feedback types underlying the Mode 1-1 for the carrier #1, the Mode 2-1 for the carrier #2, the Mode 1-0 for the carrier #3, the Mode 2-0 for the carrier #4 and the Mode 1-1 for the carrier #5 can be configured by the BS. In this way, the following rule can be defined: when a collision occurs, a type with a high priority will be fed back while a type with a low priority will be discarded. For example, as configured by the BS, a type underlying the Mode 1-0 for the carrier #3 has a higher priority than a type underlying the Mode 2-0 for the carrier #4. In this case, when the Type 3 underlying the Mode 2-0 for the carrier #4 collides with the Type 4 underlying the Mode 1-0 for the carrier #3, the Type 4 underlying the Mode 1-0 for the carrier #3 will override the Type 3 underlying the Mode 2-0 for the carrier #4. In other words, when such a collision occurs, only the Type 4 underlying the Mode 1-0 for carrier #3 will be transmitted, while the Type 3 underlying the Mode 2-0 for the carrier #4 will be discarded.

EXAMPLE 5(a)

In the case of a periodic feedback, it is proposed to prevent different types underlying different feedback modes for a single UE from colliding with each other within one sub-frame by defining a collision solution rule. In this example, the collision solution rule is defined as a downlink primary carrier component (DLPCC)-prioritized rule in which a mode for a downlink primary carrier component has a high priority. When a collision occurs, a type with a high priority will be fed back while a type with a low priority will be discarded. In order to avoid collision between non-DLPCC carriers, further priorities can be defined for these carriers, in which a mode for a high-priority carrier has a high priority. Again, when a collision occurs, a type with a high priority will be fed back while a type with a low priority will be discarded.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3},$$

and $$(10 \times n_f + \lfloor n_s/2 \rfloor - N_{OFFSET,CQI}^{(1)}) \mod N_P^{(1)} = 0 \text{ for Type 2},$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(4)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3},$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4},$$

and $$(10 \times n_f + \lfloor n_s/2 \rfloor - N_{OFFSET,CQI}^{(2)}) \mod N_P^{(2)} = 0 \text{ for Type 1},$$

respectively, where $n_f$ is the number system frames; $n_s$ is the number of time slots in one radio frame; $N_{OFFSET,CQI}^{(2)}$ the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

As described above, the carrier #2 is the DLPCC in the Exemplary Scenario (a). In this case, a type underlying the Mode 2-0 has a higher priority than a type underlying the Mode 1-1. Thus, the following rule can be defined: when a collision occurs, a type with a high priority will be fed back while a type with a low priority will be discarded. For example, when the Type 3 underlying the Mode 2-0 collides with the Type 2 underlying the Mode 1-1, the Type 3 underlying the Mode 2-0 will override the Type 2 underlying the Mode 1-1. In other words, when such a collision occurs, only the Type 3 underlying the Mode 2-0 will be transmitted, while the Type 2 underlying the Mode 1-1 will be discarded.

EXAMPLE 5(b)

In the case of a periodic feedback, it is proposed to prevent different types underlying different feedback modes for a single UE from colliding with each other within one sub-frame by defining a collision solution rule. In this example, the collision solution rule is defined as a downlink primary carrier component (DLPCC)-prioritized rule in which a mode for a downlink primary carrier component has a high priority. When a collision occurs, a type with a high priority will be fed back while a type with a low priority will be discarded. In order to avoid collision between non-DLPCC carriers, further priorities can be defined for these carriers, in which a mode for a high-priority carrier has a high priority. Again, when a collision occurs, a type with a high priority will be fed back while a type with a low priority will be discarded.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); T and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_S$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $H_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_S$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

As described above, the carrier #1 is the DLPCC in the Exemplary Scenario (b). In this case, a type underlying the Mode 1-1 for the carrier #1 has a higher priority than a type underlying any other modes. Thus, the following rule can be defined: when a collision occurs, a type with a high priority will be fed back while a type with a low priority will be discarded. For example, when the Type 2 underlying the Mode 1-1 for the carrier #1 collides with the Type 4 underlying the Mode 2-0 for the carrier #4, the Type 2 underlying the Mode 1-1 for the carrier #1 will override the Type 4 underlying the Mode 2-0 for the carrier #4. In other words, when such a collision occurs, only the Type 2 underlying the Mode 1-1 for carrier #1 will be transmitted, while the Type 4 underlying the Mode 2-0 for the carrier #4 will be discarded.

EXAMPLE 6(a)

In the case of a periodic feedback, it is proposed to prevent different types underlying different feedback modes for a single UE from colliding with each other within one sub-frame by defining a collision solution rule. In this example, the collision solution rule is defined as a content-prioritized rule in which a type carrying larger amount of information has a higher priority. When a collision occurs, a type with a high priority will be fed back while a type with a low priority will be discarded.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

In the Exemplary Scenario (a), for example, when the Type 1 underlying the Mode 2-0 collides with the Type 3 underlying the Mode 1-1 and the Type 1 underlying the Mode 2-0 carries a larger amount of information, the Type 1 underlying the Mode 2-0 will override the Type 3 underlying the Mode 1-1. In other words, when such a collision occurs, only the Type 1 underlying the Mode 2-0 wily be transmitted, while the Type 3 underlying the Mode 1-1 will be discarded.

EXAMPLE 6(b)

In the case of a periodic feedback, it is proposed to prevent different types underlying different feedback modes for a single UE from colliding with each other within one sub-frame by defining a collision solution rule. In this example, the collision solution rule is defined as a content-prioritized rule in which a type carrying larger amount of information has a higher priority. When a collision occurs, a type with a high priority will be fed back while a type with a low priority will be discarded.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(2)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

In the Exemplary Scenario (b), for example, when the Type 1 underlying the Mode 2-1 for the carrier #2 collides with the Type 4 underlying the Mode 2-0 for the carrier #4 and the Type 1 underlying the Mode 2-1 for the carrier #2 carries a larger amount of information, the Type 1 underlying the Mode 2-1 for the carrier #2 will override the Type 4 underlying the Mode 2-0 for the carrier #4. In other words, when such a collision occurs, only the Type 1 underlying the Mode 2-1 for the carrier #2 will be transmitted, while the Type 4 underlying the Mode 2-0 for the carrier #4 will be discarded.

EXAMPLE 7(a)

In the case of a periodic feedback, it is proposed to solve the problem of excessive total feedback overhead for various feedback modes in an aggregated feedback manner. In this example, a plurality of pieces of RI information (Type 3) is concatenated for transmission, without any coding process. In connection with the above Example 6(a), the concatenated Types 3 generally carry a larger amount of information and thus have a higher priority when compared with other non-concatenated types.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband. PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

Herein, the RI information (Type 3) underlying the Mode 1-1 and the Mode 2-0 can be transmitted in an aggregated manner. In other words, the Types 3 underlying these two modes can be concatenated for transmission, without any coding process. If the Types 3 underlying the Mode 1-1 and the Mode 2-0 each have an overhead of 3 bits, then the overhead required for the aggregated transmission is 6 bits.

EXAMPLE 7(b)

In the case of a periodic feedback, it is proposed to solve the problem of excessive total feedback overhead for various feedback modes in an aggregated feedback manner. In this example, a plurality of pieces of RI information (Type 3) is concatenated for transmission, without any coding process. In connection with the above Example 6(b), the concatenated Types 3 generally carry a larger amount of information and thus have a higher priority when compared with other non-concatenated types.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \bmod (N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \bmod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \bmod (H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \bmod (H^{(2)} \cdot N_P^{(2)}) = 0 \text{ for Type 2,}$$

and $$(10 \times n_f + \lfloor n_s/2 \rfloor - N_{OFFSET,CQI}^{(2)}) \bmod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,CQI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \bmod (N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \bmod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \bmod (H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \bmod (H^{(4)} \cdot N_P^{(4)}) = 0 \text{ for Type 4,}$$

and $$(10 \times n_f + \lfloor n_s/2 \rfloor - N_{OFFSET,CQI}^{(4)}) \bmod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0$ for Type 3, and $(10 \times n_f + \lfloor n_s/2 \rfloor - N_{OFFSET,CQI}^{(5)}) \mod N_P^{(5)} = 0$ for Type 2, respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

Herein, the Types 3 underlying the Mode 1-1 for the carrier #1, the Mode 2-1 for the carrier #2 and the Mode 2-0 for the carrier #4 can be transmitted in an aggregated manner. In other words, the Types 3 underlying these three modes can be concatenated for transmission, without any coding process. If the Types 3 underlying the Mode 1-1 for the carrier #1, the Mode 2-1 for the carrier #2 and the Mode 2-0 for the carrier #4 each have an, overhead of 3 bits, then the overhead required for the aggregated transmission is 9 bits.

EXAMPLE 8(a)

In the case of a periodic feedback, it is proposed to solve the problem of excessive total feedback overhead for various feedback modes in an aggregated feedback manner. In this example, a plurality of pieces of RI information is subjected to a joint coding process and transmitted simultaneously. In connection with the above Example 6(a), the aggregated Types 3 generally carry a larger amount of information and thus have a higher priority when compared with other non-aggregated types.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0$ for Type 3, and $(10 \times n_f + \lfloor n_s/2 \rfloor - N_{OFFSET,CQI}^{(1)}) \mod N_P^{(1)} = 0$ for Type 2, respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which, is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0$ for Type 3, and $(10 \times n_f + \lfloor n_s/2 \rfloor - N_{OFFSET,CQI}^{(2)}) \mod(H^{(2)} \cdot N_P^{(2)}) = 0$ for Type 4, and $(10 \times n_f + \lfloor n_s/2 \rfloor - N_{OFFSET,CQI}^{(2)}) \mod N_P^{(2)} = 0$ for Type 1, respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

Herein, the RI information (Type 3) for the Mode 1-1 and the Mode 2-0 can be subjected to a joint coding process and transmitted in an aggregated manner. In other words, the Types 3 underlying these two modes can be subjected to a joint coding process and transmitted simultaneously. The joint coding process includes a variety of prior art techniques, such as block coding (in which redundant information is added to a code block in units of blocks), cyclic check coding (in which a number of check bits are appended to the information bits such that the coded codewords can satisfy predefined digital/analog characteristics), unbalanced joint coding (in which different levels of redundant information can be added to different coding sections), differential coding (in which, with respect to a selected reference, other information can be coded in a differential way), and the like. As it is impossible to exhaust the existing joint coding techniques, the differential coding scheme is assumed here for explaining this example. However, it is to be noted that, benefiting from the teaching of this example, those skilled in the art can readily implement other joint coding schemes.

In this example, an inter-mode differential coding is applied to the RI information (Type 3). Herein, with respect to the RI of a specified feedback mode as a reference, the RIs of the other feedback modes are differentially coded. The rule of the differential coding depends on a differential coding table pre-agreed between the BS and the UE.

In an embodiment, the specified feedback mode is a feedback mode for the DLPCC.

In the above Exemplary Scenario (a), the carrier #2 is the DLPCC. Thus, with respect to the RI of the Mode 2-0 for the carrier #2 as a reference, the RIs of the other feedback modes are differentially coded. In this case, the rule of the differential coding depends on a differential coding table pre-agreed between the BS and the UE. Table 1 is an example of such a differential coding table for RI. It is to be noted that the 2-bit differential coding as shown in Table 1 is exemplary only. The implementation of the present invention is not limited to the coding of Table 1. In fact, a 1-bit differential coding is also feasible. The implementation of the 1-bit differential coding is the same as the one shown in this example and its description is thus omitted here.

TABLE 1

Differential Coding Table for RI

| Reference RI | Differentially Coded RI (2-bit) | | | |
|---|---|---|---|---|
| | 00 | 01 | 10 | 11 |
| 1 | 1 | 2 | 3 | 4 |
| 2 | 2 | 1 | 3 | 4 |
| 3 | 3 | 1 | 2 | 4 |
| 4 | 4 | 2 | 3 | 5 |
| 5 | 5 | 3 | 4 | 6 |
| 6 | 6 | 4 | 5 | 7 |
| 7 | 7 | 5 | 6 | 8 |
| 8 | 8 | 5 | 6 | 7 |

According to Table 1, it is assumed that the RI for the Mode 2-0 equals to 3 and the RI for the Mode 1-1 equals to 2. As such, the event "the RI for the Mode 2-0 equals to 3" can be characterized by three bits (010) and the event "the RI for the Mode 1-1 equals to 2" can be characterized by two bits (10). Then, these five bits can be concatenated to constitute the RI information (Type 3) for aggregated transmission.

Alternatively, the specified feedback mode is a feedback mode configured by the BS with upper layer signaling.

In the Exemplary Scenario (a), the BS can configure by means of upper layer signaling that the RI of the Mode 1-1 is used as a reference and the RIs of other feedback modes are differentially coded with respect to the reference. In this case, the rule of the differential coding depends on a differential coding table pre-agreed between the BS and the UE. Table 1 is an example of such a differential coding table for RI. It is to be noted that the 2-bit differential coding as shown in Table 1 is exemplary only. The implementation of the present invention is not limited to the coding of Table 1. In fact, a 1-bit differential coding is also feasible. The implementation of the 1-bit differential coding is the same as the one shown in this example and its description is thus omitted here.

According to Table 1, it is assumed that the RI for the Mode 2-0 equals to 3 and the RI for the Mode 1-1 equals to 2. As such, the event "the RI for the Mode 1-1 equals to 2" can be characterized by three bits (001) and the event "the RI for the Mode 2-0 equals to 3" can be characterized by two bits (10). Then, these five bits can be concatenated to constitute the RI information (Type 3) for aggregated transmission.

EXAMPLE 8(b)

In the case of a periodic feedback, it is proposed to solve the problem of excessive total feedback overhead for various feedback modes in an aggregated feedback manner. In this example, a plurality of pieces of RI information is subjected to a joint coding process and transmitted simultaneously. In connection with the above Example 6(b), the aggregated Types 3 generally carry a larger amount of information and thus have a higher priority when compared with other non-aggregated types.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for, the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$);

and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

Herein, the Types 3 underlying the Mode 1-1 for the carrier #1, the Mode 2-1 for the carrier #2 and the Mode 1-1 for the carrier #5 can be subjected to a joint coding process and transmitted in an aggregated manner. In other words, the Types 3 underlying these three modes can be subjected to a joint coding process and transmitted simultaneously. The joint coding process includes a variety of prior art techniques, such as block coding (in which redundant information is added to a code block in units of blocks), cyclic check coding (in which a number of check bits are appended to the information bits such that the coded codewords can satisfy predefined digital/analog characteristics), unbalanced joint coding (in which different levels of redundant information can be added to different coding sections), differential coding (in which, with respect to a selected reference, other information can be coded in a differential way), and the like. As it is impossible to exhaust the existing joint coding techniques, the differential coding scheme is assumed here for explaining this example. However, it is to be noted that, benefiting from the teaching of this example, those skilled in the art can readily implement other joint coding schemes.

In this example, an inter-carrier differential coding is applied to the RI information (Type 3). Herein, with respect to the RI of the feedback mode for a specified carrier as a reference, the RIs of the other feedback modes are differentially coded. The rule of the differential coding depends on a differential coding table pre-agreed between the BS and the UE.

In an embodiment, the specified carrier is the DLPCC.

In the above Exemplary Scenario (b), the carrier #1 is the DLPCC. Thus, with respect to the RI of the Mode 1-1 for the carrier #1 as a reference, the RIs of the other feedback modes are differentially coded. In this case, the rule of the differential coding depends on a differential coding table pre-agreed between the BS and the UE. Table 1 is an example of such a differential coding table for RI. It is to be noted that the 2-bit differential coding as shown in Table 1 is exemplary only. The implementation of the present invention is not limited to the coding of Table 1. In fact, a 1-bit differential coding is also feasible. The implementation of the 1-bit differential coding is the same as the one shown in this example and its description is thus omitted here.

According to Table 1, it is assumed that the RI of the Mode 1-1 for the carrier #1 equals to 3, the RI of the Mode 2-1 for the carrier #2 equals to 4 and the RI of the Mode 1-1 for the carrier #5 equals to 1. As such, the event "the RI of the Mode 1-1 for the carrier #1 equals to 3" can be characterized by three bits (010), the event "the RI of the Mode 2-1 for the carrier #2 equals to 4" can be characterized by two bits (11) and the event "the RI of the Mode 1-1 for the carrier #5 equals to 1" can be characterized by two bits (01). Then, these seven bits can be concatenated to constitute the RI: information (Type 3) for aggregated transmission.

Alternatively, the specified carrier can be a carrier configured by the BS with upper layer signaling.

In the Exemplary Scenario (b), the BS can configure by means of upper layer signaling that the RI of the Mode 1-1 for the carrier #5 is used as a reference and the RIs of other feedback modes are differentially coded with respect to the reference. In this case, the rule of the differential coding depends on a differential coding table pre-agreed between the BS and the UE. Table 1 is an example of such a differential coding table for RI. It is to be noted that the 2-bit differential coding as shown in Table 1 is exemplary only. The implementation of the present invention is not limited to the coding of Table 1. In fact, a 1-bit differential coding is also feasible. The implementation of the 1-bit differential coding is the same as the one shown in this example and its description is thus omitted here.

According to Table 1, it is assumed that the RI of the Mode 1-1 for the carrier #1 equals to 3, the RI of the Mode 2-1 for the carrier #2 equals to 4 and the RI of the Mode 1-1 for the carrier #5 equals to 1. As such, the event "the RI of the Mode 1-1 for the carrier #5 equals to 1" can be characterized by three bits (000), the event "the RI of the Mode 2-1 for the carrier #2 equals to 4" can be characterized by two bits (11) and the event "the RI of the Mode 1-1 for the carrier #1 equals to 3" can be characterized by two bits (10). Then, these seven bits can be concatenated to constitute the RI information (Type 3) for aggregated transmission.

EXAMPLE 9(b1)

In the case of a periodic feedback, it is proposed to solve the problem of excessive total feedback overhead for various feedback modes in an aggregated feedback manner. In this example, a plurality of pieces of broadband CQI information (Type 4) is subjected to a joint coding process and transmitted simultaneously. In connection with the above Example 6(b), the aggregated Types 4 generally carry a larger amount of information and thus have a higher priority when compared with other non-aggregated types.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3},$$

and $$(10 \times n_f + \lfloor n_s/2 \rfloor - N_{OFFSET,CQI}^{(1)}) \mod N_P^{(1)} = 0 \text{ for Type 2},$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3},$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2},$$

and $$(10 \times n_f + \lfloor n_s/2 \rfloor - N_{OFFSET,CQI}^{(2)}) \mod N_P^{(2)} = 0 \text{ for Type 1},$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$);

and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$; is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$);

and $N_P^{(5)}$ and $M_{RI}^{(5)}$ are periodic parameters for the feedback modes in the Mode 1-1 for the carrier #5, each being a positive integer.

Herein, the Types 4 underlying the Mode 1-0 for the carrier #3 and the Mode 2-0 for the carrier #4 can be subjected to a joint coding process and transmitted in an aggregated manner. In other words, the Types 4 underlying these two modes can be subjected to a joint coding process and transmitted simultaneously. The joint coding process includes a variety of prior art techniques, such as block coding (in which redundant information is added to a code block in units of blocks), cyclic check coding (in which a number of check bits are appended to the information bits such that the coded codewords can satisfy predefined digital/analog characteristics), unbalanced joint coding (in which different levels of redundant information can be added to different coding sections), differential coding (in which, with respect to a selected reference, other information can be coded in a differential way), and the like. As it is impossible to exhaust the existing joint coding techniques, the differential coding scheme is assumed here for explaining this example. However, it is to be noted that, benefiting from the teaching of this example, those skilled in the art can readily implement other joint coding schemes.

In this example, an inter-mode differential coding is applied to the broadband CQI information (Type 4). Herein, with respect to the broadband CQI of a specified feedback mode as a reference, the broadband CQIs of the other feedback modes are differentially coded. The rule of the differential coding depends on a differential coding table pre-agreed between the BS and the UE.

In an embodiment, the specified feedback mode is the feedback mode for the DLPCC.

In the above Exemplary Scenario (b), the carrier #4 is assumed to be the DLPCC temporarily for this example. Thus, with respect to the broadband CQI (Type 4) of the Mode 2-0 for the carrier #4 as a reference, the broadband CQIs of the other feedback modes are differentially coded. In this case, the rule of the differential coding depends on a differential coding table pre-agreed between the BS and the UE. Table 2 is an example of such a differential coding table for broadband CQI. It is to be noted that the 3-bit differential coding as shown in Table 2 is exemplary only. The implementation of the present invention is not limited to the coding of Table 2. In fact, a 1-bit or 2-bit differential coding is also feasible. The implementation of the 1-bit differential coding is the same as the one shown in this example and its description is thus omitted here.

TABLE 2

Differential Coding Table for Broadband CQI

| Differentially Coded Broadband CQI (3-bit) | Broadband CQI |
|---|---|
| 000 | 0 |
| 001 | 1 |
| 010 | 2 |
| 011 | 3 |
| 100 | ≥4 |
| 101 | −1 |
| 110 | −2 |
| 111 | ≤−3 |

According to Table 2, it is assumed that the broadband CQI of the Mode 2-0 for the carrier #4 equals to 12 and the broadband CQI of the Mode 1-0 for the carrier #3 equals to 10. As such, the event "the broadband CQI of the Mode 2-0 for the carrier #4 equals to 12" can be characterized by four bits (1100) and the event "the broadband CQI of the Mode 1-0 for the carrier #3 equals to 10" can be characterized by three bits (110). Then, these seven bits can be concatenated to constitute the broadband CQI information (Type 4) for aggregated transmission.

Alternatively, the specified feedback mode can be a feedback mode configured by the BS with upper layer signaling.

In the Exemplary Scenario (b), the BS can configure by means of upper layer signaling that the broadband CQI information (Type 4) of the Mode 1-0 for the carrier #3 is used as a reference and the broadband CQIs of other feedback modes are differentially coded with respect to the reference. In this case, the rule of the differential coding depends on a differential coding table pre-agreed between the BS and the UE. Table 2 is an example of such a differential coding table for broadband CQI. It is to be noted that the 3-bit differential coding as shown in Table 2 is exemplary only. The implementation of the present invention is not limited to the coding of Table 2. In fact, a 1-bit or 2-bit differential coding is also feasible. The implementation of the 1-bit differential coding is the same as the one shown in this example and its description is thus omitted here.

According to Table 2, it is assumed that the broadband CQI of the Mode 2-0 for the carrier #4 equals to 12 and the broadband CQI of the Mode 1-0 for the carrier #3 equals to 10. As such, the event "the broadband CQI of the Mode 1-0 for the carrier #3 equals to 10" can be characterized by four bits (1010) and the event "the broadband CQI of the Mode 2-0 for the carrier #4 equals to 12" can be characterized by three bits (010). Then, these seven bits can be concatenated to constitute the broadband CQI information (Type 4) for aggregated transmission.

EXAMPLE 9(b2)

In the case of a periodic feedback, it is proposed to solve the problem of excessive total feedback overhead for: various feedback modes in an aggregated feedback manner. In this example, a plurality of pieces of broadband CQI information (Type 4) is subjected to a joint coding process and transmitted simultaneously. In connection with the above Example 6(b), the aggregated Types 4 generally carry a larger amount of information and thus have a higher priority when compared with other non-aggregated types.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier. #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

Herein, the Types 4 underlying the Mode 1-0 for the carrier #3 and the Mode 2-0 for the carrier #4 can be subjected to a joint coding process and transmitted in an aggregated manner. In other words, the Types 4 underlying these two modes can be subjected to a joint coding process and transmitted simultaneously. The joint coding process includes a variety of prior art techniques, such as block coding (in which redundant information is added to a code block in units of blocks), cyclic check coding (in which a number of check bits are appended to the information bits such that the coded codewords can satisfy predefined digital/analog characteristics), unbalanced joint coding (in which different levels of redundant information can be added to different coding sections), differential coding (in which, with respect to a selected reference, other information can be coded in a differential way), and the like. As it is impossible to exhaust the existing joint coding techniques, the differential coding scheme is assumed here for explaining this example. However, it is to be noted that, benefiting from the teaching of this example, those skilled in the art can readily implement other joint coding schemes.

In this example, an inter-carrier differential coding is applied to the broadband CQI information (Type 4). Herein, with respect to the broadband CQI of the feedback mode for a specified carrier as a reference, the broadband CQIs of the other feedback modes are differentially coded. The rule of the differential coding depends on a differential coding table pre-agreed between the BS and the UE.

In an embodiment, the specified carrier is the DLPCC.

In the above Exemplary Scenario (b), the carrier #4 is assumed to be the DLPCC temporarily for this example. Thus, with respect to the broadband CQI (Type 4) of the Mode 2-0 for the carrier #4 as a reference, the broadband CQIs of the other feedback modes are differentially coded. In this case, the rule of the differential coding depends on a differential coding table pre-agreed between the BS and the UE. Table 2 is an example of such a differential coding table for broadband CQI. It is to be noted that the 3-bit differential coding as shown in Table 2 is exemplary only. The implementation of the present invention is not limited to the coding of Table 2. In fact, a 1-bit or 2-bit differential coding is also feasible. The implementation of the 1-bit differential coding is the same as the one shown in this example and its description is thus omitted here.

According to Table 2, it is assumed that the broadband CQI of the Mode 2-0 for the carrier. #4 equals to 12 and the broadband CQI of the Mode 1-0 for the carrier #3 equals to 10. As such, the event "the broadband CQI of the Mode 2-0 for the carrier #4 equals to 12" can be characterized by four bits (1100) and the event "the broadband CQI of the Mode 1-0 for the carrier #3 equals to 10" can be characterized by three bits (110). Then, these seven bits can be concatenated to constitute the broadband CQI information (Type 4) for aggregated transmission.

Alternatively, the specified carrier can be a carrier configured by the BS with upper layer signaling.

In the Exemplary Scenario (b), the BS can configure by means of upper layer signaling that the broadband CQI information (Type 4) of the Mode 1-0 for the carrier #3 is used as a reference and the broadband CQIs of other feedback modes are differentially coded with respect to the reference. In this case, the rule of the differential coding depends on a differential coding table pre-agreed between the BS and the UE. Table 2 is an example of such a differential coding table for broadband CQI. It is to be noted that the 3-bit differential coding as shown in Table 2 is exemplary only. The implementation of the present invention is not limited to the coding of Table 2. In fact, a 1-bit or 2-bit differential coding is also feasible. The implementation of the 1-bit differential coding is the same as the one shown in this example and its description is thus omitted here.

According to Table 2, it is assumed that the broadband CQI of the Mode 2-0 for the carrier #4 equals to 12 and the broadband CQI of the Mode 1-0 for the carrier #3 equals to 10. As such, the event "the broadband CQI of the Mode 1-0 for the carrier #3 equals to 10" can be characterized by four bits (1010) and the event "the broadband CQI of the Mode 2-0 for the carrier #4 equals to 12" can be characterized by three bits (010). Then, these seven bits can be concatenated to constitute the broadband CQI information (Type 4) for aggregated transmission.

EXAMPLE 10(a)

In the case of a periodic feedback, it is proposed to solve the problem of excessive total feedback overhead for various feedback modes in an aggregated feedback manner. In this example, a plurality of types is concatenated for transmission, without any coding process. In connection with the above Example 6(a), the concatenated types generally carry a larger amount of information and thus have a higher priority when compared with other non-concatenated types.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

Herein, the Type 3 underlying the Mode 1-1 and the Type 4 underlying the Mode 2-0 can be transmitted in an aggregated manner. In other words, one Type 3 and one Type 4 can be concatenated for transmission, without any coding process. If the Type 3 underlying the Mode 1-1 has an overhead of 3 bits and the Type 4 underlying the Mode 2-0 has an overhead of 4 bits, then the overhead required for the aggregated transmission is 7 bits. It is to be noted that the plurality of types concatenated for transmission can be types underlying a single mode or types underlying different modes.

EXAMPLE 10(b)

In the case of a periodic feedback, it is proposed to solve the problem of excessive total feedback overhead for various feedback modes in an aggregated feedback manner. In this example, a plurality of types is concatenated for transmission, without any coding process. In connection with the above Example 6(b), the concatenated types generally carry a larger amount of information and thus have a higher priority when compared with other non-concatenated types.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

Herein, the Type 3 underlying the Mode 1-1 for the carrier #1, the Type 3 underlying the Mode 2-1 for the carrier #2 and the Type 4 underlying the Mode 2-0 for the carrier #4 can be transmitted in an aggregated manner. In other words, two Types 3 and one Type 4 can be concatenated for transmission, without any coding process. If the Type 3 underlying the Mode 1-1 for the carrier #1 has an overhead of 3 bits, the Type 3 underlying the Mode 2-1 for the carrier #2 has an overhead of 3 bits and the Type 4 underlying the Mode 2-0 for the carrier #4 has an overhead of 4 bits, then the overhead required for the aggregated transmission is 10 bits. It is to be noted that the plurality of types concatenated for transmission can be types underlying a single mode or types underlying different modes.

EXAMPLE 11(a)

In the case of a periodic feedback, it is proposed to solve the problem of excessive total feedback overhead for various feedback modes in an aggregated feedback manner. In this example, a plurality of types is subjected to a joint coding process and transmitted simultaneously. Here, the joint coding process includes a variety of existing techniques such as block coding, unbalanced joint coding, differential coding and the like. In connection with the above Example 6(a), the aggregated types generally carry a larger amount of information and thus have a higher priority when compared with other non-aggregated types.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \bmod (N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \bmod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type: 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \bmod (H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \bmod (H^{(2)} \cdot N_P^{(2)}) = 0 \text{ for Type 4,}$$

and $$(10 \times n_f + \lfloor n_s/2 \rfloor - N_{OFFSET,CQI}^{(2)}) \bmod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0 (representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

Herein, the Type 3 underlying the Mode 1-1 and the Type 4 underlying the Mode 2-0 can be subjected to a joint coding process and transmitted in an aggregated manner. In other words, one Type 3 and one Type 4 can be subjected to a joint coding process and transmitted simultaneously. The joint coding process includes a variety of prior art techniques, such as block coding (in which redundant information is added to a code block in units of blocks), cyclic check coding (in which a number of check bits are appended to the information bits such that the coded codewords can satisfy predefined digital/analog characteristics), unbalanced joint coding (in which different levels of redundant information can be added to different coding sections), differential coding (in which, with respect to a selected reference, other information can be coded in a differential way), and the like. As it is impossible to exhaust the existing joint coding techniques, the unbalanced coding scheme is assumed here for explaining this example. However, it is to be noted that, benefiting from the teaching of this example, those skilled in the art can readily implement other joint coding schemes.

It is assumed that the Type 3 underlying the Mode 1-1 has an overhead of 3 bits and the Type 4 underlying the Mode 2-0 has an overhead of 4 bits. In addition, a high level of coding protection is given to the Type 3 underlying the Mode 1-1, i.e., two bits of redundancy protection is added. On the other hand, a low level of coding protection is given to the Type 4 underlying the Mode 2-0, i.e., 1 bit of redundancy protection is added. In this case, the overhead required for the aggregated transmission is 10 bits. It is to be noted that the plurality of types which is transmitted simultaneously can be types underlying a single mode or types underlying different modes.

EXAMPLE 11(b)

In the case of a periodic feedback, it is proposed to solve the problem of excessive total feedback overhead for various feedback modes in an aggregated feedback manner. In this example, a plurality of types is subjected to a joint coding process and transmitted simultaneously. Here, the joint coding process includes a variety of existing techniques such as block coding, unbalanced joint coding, differential coding and the like. In connection with the above Example 6(b), the aggregated types generally carry a larger amount of information and thus have a higher priority when compared with other non-aggregated types.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$);

and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

Herein, the Type 3 underlying the Mode 1-1 for the carrier #1, the Type 3 underlying the Mode 2-1 for the carrier #2 and the Type 4 underlying the Mode 2-0 for the carrier #4 can be transmitted in an aggregated manner. In other words, two Types 3 and one Type 4 can be subjected to a joint coding process and transmitted simultaneously. The joint coding process includes a variety of prior art techniques, such as block coding (in which redundant information is added to a code block in units of blocks), cyclic check coding (in which a number of check bits are appended to the information bits such that the coded codewords can satisfy predefined digital/analog characteristics), unbalanced joint coding (in which different levels of redundant information can be added to different coding sections), differential coding (in which, with respect to a selected reference, other information can be coded in a differential way), and the like. As it is impossible to exhaust the existing joint coding techniques, the unbalanced coding scheme is assumed here for explaining this example. However, it is to be noted that, benefiting from the teaching of this example, those skilled in the art can readily implement other joint coding schemes.

EXAMPLE 12(a)

In the case of a periodic feedback, it is proposed to solve the problem of excessive total feedback overhead for various feedback modes by an optimized feedback scheme for W1. In this example, a new type can be defined for W1, which is referred to as Type 5.

The period of the newly defined Type 5 can be configured to be:
the same as the period of Type 3;
a multiple of the period of Type 2 or Type 4; or
a multiple of the period of Type 1.

The feedback sub-frame offset of the newly defined Type 5 can be configured to be:
the same as the sub-frame offset of Type 2 or Type 4; or
the same as the sub-frame offset of Type 3.

The sharing mode for the newly defined Type 5 can be configured such that:
one W1 is shared by a plurality of modes; or
one W1 is shared by a plurality of carriers.

The carrier-shared mode for the newly defined Type 5 can be configured such that:

said plurality of carriers is included in one transmission approach; or
said plurality of carriers is an arbitrary number of carriers out of all carriers.

The aggregated transmission mode of the newly defined Type 5 can be configured such that:
a plurality of W1s is aggregated into a single sub-frame for transmission.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding periodic feedback mode is Mode 1-1. Further, the transmission approach for the carriers #3, #4 and #5 is assumed to be "3) open-loop space division multiplexing" and the corresponding periodic feedback mode is Mode 2-0.

As noted above, the Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The feedback sub-frames for Type 3 and Type 2 of the Mode 1-1 satisfy $$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,CQI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1, each being a positive integer.

On the other hand, the feedback sub-frames for Type 3, Type 4 and Type 1 of the Mode 2-0 satisfy $$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 4,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-0

(representing both the sub-frame offset for broadband CQI feedback and the sub-frame offset for sub-band CQI feedback); $N_{OFFSET,RI}^{(2)}$ is the sub-frame offset for the RI feedback in the Mode 2-0 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-0, each being a positive integer.

For example, in the LTE-A system, it is required to feed back W1 for the Mode 2-0. As such, a new type referred to as Type 5 is defined for W1.

The period of the newly defined Type 5 can be configured to be:
  the same as the period of Type 3, $H^{(2)} \cdot N_P^{(2)} \cdot M_{RI}^{(2)}$;
  a multiple of the period of Type 2, $H^{(2)} \cdot N_P^{(2)}$; or
  a multiple of the period of Type 1, $N_P^{(2)}$.

The feedback sub-frame offset of the newly defined Type 5 can be configured to be:
  the same as the sub-frame offset of Type 2, $N_{OFFSET,CQI}^{(2)}$; or
  the same as the sub-frame offset of Type 3, $N_{OFFSET,RI}^{(2)}$.

The sharing mode for the newly defined Type 5 can be configured such that one W1 can be shared by the Mode 1-1 and the Mode 2-0, for example. That is, these two modes share the same Type 5 which is not necessary to be repeatedly fed back.

Alternatively, the sharing mode for the newly defined Type 5 can be configured such that the Mode 2-0 containing three carriers #3, #4 and #5, for example, has only one W1, i.e., three carriers #3, #4 and #5 share one W1. That is, these three carriers share the same Type 5 which is not necessary to be repeatedly fed back.

Further, the carrier-shared mode for the newly defined Type 5 can be configured such that, for the carriers #3, #4 and #5 each having a transmission approach of "3) open-loop space division multiplexing", for example, the transmission approach has only one W1, i.e., three carriers #3, #4 and #5 share one W1. That is, That is, these three carriers share the same Type 5 which is not necessary to be repeatedly fed back.

Alternatively, the carrier-shared mode for the newly defined Type 5 can be configured such that, the Mode 1-1 and the Mode 2-0 can share one W1. That is, all the carriers for these two modes have the same Type 5 which is not necessary to be repeatedly fed back.

In addition, the aggregated transmission mode of the newly defined Type 5 can be configured such that each of the Mode 1-1 and the Mode 2-0 can have one W1, i.e., these two modes can have different Types 5. In this case, the W1 information can be fed back in an aggregated manner by utilizing the above process for aggregated feedback of RI information or broadband CQI information.

In an embodiment, the specified feedback mode can be the feedback mode for the DLPCC.

In the above Exemplary Scenario (a), the carrier #2 is the DLPCC. Thus, with respect to the W1 of the Mode 2-0 for the carrier #2 as a reference, the W1s of the other feedback modes are differentially coded. In this case, the rule of the differential coding depends on a differential coding table pre-agreed between the BS and the UE. Table 3 is an example of such a differential coding table for W1. It is to be noted that the 2-bit differential coding as shown in Table 3 is exemplary only. The implementation of the present invention is not limited to the coding of Table 3. In fact, a 1-bit differential coding is also feasible. The implementation of the 1-bit differential coding is the same as the one shown in this example and its description is thus omitted here.

TABLE 3

Differential Coding Table for W1

| Reference W1 | Differentially Coded W1 (2-bit) | | | |
|---|---|---|---|---|
| | 00 | 01 | 10 | 11 |
| 1 | 1 | 2 | 3 | 4 |
| 2 | 2 | 1 | 3 | 4 |
| 3 | 3 | 1 | 2 | 4 |
| 4 | 4 | 2 | 3 | 5 |
| 5 | 5 | 3 | 4 | 6 |
| 6 | 6 | 4 | 5 | 7 |
| 7 | 7 | 5 | 6 | 8 |
| 8 | 8 | 5 | 6 | 7 |

According to Table 3, it is assumed that the W1 for the Mode 2-0 equals to 3 and the W1 for the Mode 1-1 equals to 2. As such, the event "the WI for the Mode 2-0 equals to 3" can be characterized by three bits (010) and the event "the W1 for the Mode 1-1 equals to 2" can be characterized by two bits (10). Then, these five bits can be concatenated to constitute the W1 information (Type 5) for aggregated transmission.

Alternatively, the specified feedback mode is a feedback mode configured by the BS with upper layer signaling.

In the Exemplary Scenario (a), the BS can configure by means of upper layer signaling that the W1 of the Mode 1-1 is used as a reference and the W1s of other feedback modes are differentially coded with respect to the reference. In this case, the rule of the differential coding depends on a differential coding table pre-agreed between the BS and the UE. Table 3 is an example of such a differential coding table for W1. It is to be noted that the 2-bit differential coding as shown in Table 3 is exemplary only. The implementation of the present invention is not limited to the coding of Table 3. In fact, a 1-bit differential coding is also feasible. The implementation of the 1-bit differential coding is the same as the one shown in this example and its description is thus omitted here.

According to Table 3, it is assumed that the W1 for the Mode 2-0 equals to 3 and the W1 for the Mode 1-1 equals to 2. As such, the event "the W1 for the Mode 1-1 equals to 2" can be characterized by three bits (001) and the event "the W1 for the Mode 2-0 equals to 3" can be characterized by two bits (10). Then, these five bits can be concatenated to constitute the W1 information (Type 5) for aggregated transmission.

EXAMPLE 12(b)

In the case of a periodic feedback, it is proposed to solve the problem of excessive total feedback overhead for various feedback modes by an optimized feedback scheme for W1.

In this example, a new type can be defined for W1, which is referred to as Type 5.

The period of the newly defined Type 5 can be configured to be:
  the same as the period of Type 3;
  a multiple of the period of Type 2 or Type 4; or
  a multiple of the period of Type 1.

The feedback sub-frame offset of the newly defined Type 5 can be configured to be:
  the same as the sub-frame offset of Type 2 or Type 4; or
  the same as the sub-frame offset of Type 3.

The sharing mode for the newly defined Type 5 can be configured such that:

one W1 is shared by a plurality of modes; or one W1 is shared by a plurality of carriers.

The carrier-shared mode for the newly defined Type 5 can be configured such that:

said plurality of carriers is included in one transmission approach; or said plurality of carriers is an arbitrary number of carriers out of all carriers.

The aggregated transmission mode of the newly defined Type 5 can be configured such that:

a plurality of W1s is aggregated into a single sub-frame for transmission.

The above Exemplary Scenario (b) is assumed in this example. According to the 3GPP document TS36.213 V9.1.0, "Physical layer procedures", the transmission approach for carrier #1 is assumed to be "8) two-layer beam forming transmission with PMI/RI feedback" and the corresponding periodic feedback mode is Mode 1-1. The transmission approach for carrier #2 is assumed to be "4) closed-loop space division multiplexing" and the corresponding periodic feedback mode is Mode 2-1. The transmission approach for carrier #3 is assumed to be "2) transmission diversity" and the corresponding periodic feedback mode is Mode 1-0. The transmission approach for carrier #4 is assumed to be "2) transmission diversity" and the corresponding periodic feedback mode is Mode 2-0. Finally, the transmission approach for carrier #5 is assumed to be "5) multi-user MIMO" and the corresponding periodic feedback mode is Mode 1-1.

As noted above, the Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back. The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back. The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back. The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

Here, the feedback sub-frames of Type 3 and Type 2 of the Mode 1-1 for the carrier #1 satisfy:

$$(10 \times n_f + \lfloor n_s/2 \rfloor - N_{OFFSET,CQI}^{(1)} - N_{OFFSET,RI}^{(1)}) \mod(N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \mod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 for the carrier #1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 for the carrier #1 (which is actually an additive offset with respect to $N_{OFFSET,CQI}^{(1)}$); and $N_P^{(1)}$ and $M_{RI}^{(1)}$ are periodic parameters for the feedback modes in the Mode 1-1 for the carrier #1, each being a positive integer.

The feedback sub-frames of Type 3, Type 2 and Type 1 of the Mode 2-1 for the carrier #2 satisfy:

$$(10 \times n_f + \lfloor n_s/2 \rfloor - N_{OFFSET,CQI}^{(2)} - N_{OFFSET,RI}^{(2)}) \mod(H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \mod(H^{(2)} \cdot N_P^{(2)}) = 0 \text{ for Type 2,}$$

and $$(10 \times n_f + \lfloor n_s/2 \rfloor - N_{OFFSET,CQI}^{(2)}) \mod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #2 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #2 (which is actually an additive offset with respect to $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #2, each being a positive integer.

The feedback sub-frames of Type 3 and Type 4 of the Mode 1-0 for the carrier #3 satisfy:

$$(10 \times n_f + \lfloor n_s/2 \rfloor - N_{OFFSET,CQI}^{(3)} - N_{OFFSET,RI}^{(3)}) \mod(N_P^{(3)} \cdot M_{RI}^{(3)}) = 0 \text{ for Type 3,}$$

and $$(10 \times n_f + \lfloor n_s/2 \rfloor - N_{OFFSET,CQI}^{(3)}) \mod N_P^{(3)} = 0 \text{ for Type 4,}$$

respectively, where $n_f$ is the number system frames; $n_s$ is the number of time slots in one radio frame; $N_{OFFSET,CQI}^{(3)}$ is the sub-frame offset for the CQI feedback in the Mode 1-0 for the carrier #3 (representing both the sub-frame offset for broadband CQI feedback and the sub-frame offset for sub-band CQI feedback); $N_{OFFSET,RI}^{(3)}$ is the sub-frame offset for the RI feedback in the Mode 1-0 for the carrier #3 (which is actually an additive offset with respect to $N_{OFFSET,CQI}^{(3)}$); and $N_P^{(3)}$ and $M_{RI}^{(3)}$ are periodic parameters for the feedback modes in the Mode 1-0 for the carrier #3, each being a positive integer.

The feedback sub-frames of Type 3, Type 4 and Type 1 of the Mode 2-0 for the carrier #4 satisfy:

$$(10 \times n_f + \lfloor n_s/2 \rfloor - N_{OFFSET,CQI}^{(4)} - N_{OFFSET,RI}^{(4)}) \mod(H^{(4)} \cdot N_P^{(4)} \cdot M_{RI}^{(4)}) = 0 \text{ for Type 3,}$$

and $$(10 \times n_f + \lfloor n_s/2 \rfloor - N_{OFFSET,CQI}^{(4)}) \mod(H^{(4)} \cdot N_P^{(4)}) = 0 \text{ for Type 4,}$$

and $$(10 \times n_f + \lfloor n_s/2 \rfloor - N_{OFFSET,CQI}^{(4)}) \mod N_P^{(4)} = 0 \text{ for Type 1,}$$

respectively, where $n_f$ is the number system frames; $n_s$ is the number of time slots in one radio frame; $N_{OFFSET,CQI}^{(4)}$ is the sub-frame offset for the CQI feedback in the Mode 2-0 for the carrier #4 (representing both the sub-frame offset for broadband CQI feedback and the sub-frame offset for sub-band CQI feedback); $N_{OFFSET,RI}^{(4)}$ is the sub-frame offset for the RI feedback in the Mode 2-0 for the carrier #4 (which is actually an additive offset with respect to $N_{OFFSET,CQI}^{(4)}$); and $H^{(4)}$, $N_P^{(4)}$ and $M_{RI}^{(4)}$ are periodic parameters for the feedback modes in the Mode 2-0 for the carrier #4, each being a positive integer.

The feedback sub-frames of Type 3 and Type 2 of the Mode 1-1 for the carrier #5 satisfy:

$$(10 \times n_f + \lfloor n_s/2 \rfloor - N_{OFFSET,CQI}^{(5)} - N_{OFFSET,RI}^{(5)}) \mod(N_P^{(5)} \cdot M_{RI}^{(5)}) = 0 \text{ for Type 3,}$$

and $$(10 \times n_f + \lfloor n_s/2 \rfloor - N_{OFFSET,CQI}^{(5)}) \mod N_P^{(5)} = 0 \text{ for Type 2,}$$

respectively, where $n_f$ is the number system frames; $n_s$ is the number of time slots in one radio frame; $N_{OFFSET,CQI}^{(5)}$ is the sub-frame offset for the CQI feedback in the Mode 1-1 for the carrier #5 (representing both the sub-frame offset for broadband CQI feedback and the sub-frame offset for sub-band CQI feedback); $N_{OFFSET,RI}^{(5)}$ is the sub-frame offset for the RI feedback in the Mode 1-1 for the carrier #5 (which is actually an additive offset with respect to $N_{OFFSET,CQI}^{(5)}$); and $N_P^{(5)}$ and $M_{RI}^{(5)}$ are periodic parameters for the feedback modes in the Mode 1-1 for the carrier #5, each being a positive integer.

For example, in the LTE-A system, it is required to feed back W1 of the Mode 2-0 for the carrier #4. As such, a new type referred to as Type 5 is defined for W1.

The period of the newly defined Type 5 can be configured to be:

the same as the period of Type 3, $H^{(4)} \cdot N_P^{(4)} \cdot M_{RI}^{(4)}$;
a multiple of the period of Type 4, $H^{(4)} \cdot N_P^{(4)}$; or
a multiple of the period of Type 1, $N_P^{(4)}$.

The feedback sub-frame offset of the newly defined Type 5 can be configured to be:

the same as the sub-frame offset of Type 4, $N_{OFFSET,CQI}^{(4)}$; or
the same as the sub-frame offset of Type 3, $N_{OFFSET,RI}^{(4)}$.

The sharing mode for the newly defined Type 5 can be configured such that one W1 can be shared by the Mode 1-1 for the carrier #1 and the Mode 2-1 for the carrier #2, for example. That is, these two modes share the same Type 5 which is not necessary to be repeatedly fed back.

Alternatively, the sharing mode for the newly defined Type 5 can be configured such that one W1 can be shared by the Mode 1-1 for the carrier #1 and the Mode 2-1 for the carrier #2, for example. Since the Mode 1-1 for the carrier #1 contains the carrier #1 and the Mode 2-1 for the carrier #2 contains the carrier #2, the two carriers, #1 and #2, can share one W1. That is, these two carriers share the same Type 5 which is not necessary to be repeatedly fed back.

In addition, the aggregated transmission mode of the newly defined Type 5 can be configured such that each of the Mode 1-1 for the carrier #1 and the Mode 2-1 for the carrier #2 can have one W1, i.e., these two modes can have different Types 5. In this case, the W1 information can be fed back in an aggregated manner by utilizing the above process for aggregated feedback of RI information or broadband CQI information.

In an embodiment, the specified carrier is the DLPCC.

In the above Exemplary Scenario (b), the carrier #1 is the DLPCC. Thus, with respect to the W1 information of the Mode 1-1 for the carrier #1 as a reference, the W1 s of the other feedback modes are differentially coded. In this case, the rule of the differential coding depends on a differential coding table pre-agreed between the BS and the UE. Table 3 is an example of such a differential coding table for W1. It is to be noted that the 2-bit differential coding as shown in Table 3 is exemplary only. The implementation of the present invention is not limited to the coding of Table 3. In fact, a 1-bit differential coding is also feasible. The implementation of the 1-bit differential coding is the same as the one shown in this example and its description is thus omitted here.

According to Table 3, it is assumed that the W1 of the Mode 1-1 for the carrier #1 equals to 3, the W1 of the Mode 2-1 for the carrier #2 equals to 4 and the W1 of the Mode 1-1 for the carrier #5 equals to 1. As such, the event "the W1 of the Mode 1-1 for the carrier #1 equals to 3" can be characterized by three bits (010), the event "the W1 of the Mode 2-1 for the carrier #2 equals to 4" can be characterized by two bits (11) and the event "the W1 of the Mode 1-1 for the carrier #5 equals to 1" can be characterized by two bits (01). Then, these seven bits can be concatenated to constitute the W1 information (Type 5) for aggregated transmission.

Alternatively, the specified carrier can be a carrier configured by the BS with upper layer signaling.

In the Exemplary Scenario (b), the BS can configure by means of upper layer signaling that the W1 of the Mode 1-1 for the carrier #5 is used as a reference and the W1 s of other feedback modes are differentially coded with respect to the reference. In this case, the rule of the differential coding depends on a differential coding table pre-agreed between the BS and the UE. Table 3 is an example of such a differential coding table for W1. It is to be noted that the 2-bit differential coding as shown in Table 3 is exemplary only. The implementation of the present invention is not limited to the coding of Table 3. In fact, a 1-bit differential coding is also feasible. The implementation of the 1-bit differential coding is the same as the one shown in this example and its description is thus omitted here.

According to Table 3, it is assumed that the W1 of the Mode 1-1 for the carrier #1 equals to 3, the W1 of the Mode 2-1 for the carrier #2 equals to 4 and the W1 of the Mode 1-1 for the carrier #5 equals to 1. As such, the event "the W1 of the Mode 1-1 for the carrier #5 equals to 1" can be characterized by three bits (000), the event "the W1 of the Mode 2-1 for the carrier #2 equals to 4" can be characterized by two bits (11) and the event "the W1 of the Mode 1-1 for the carrier #1 equals to 3" can be characterized by two bits (10). Then, these seven bits can be concatenated to constitute the W1 information (Type 5) for aggregated transmission.

EXAMPLE 13(a)

A new feedback mode is proposed to enhance the non-periodic feedback (feedback for PUSCH).

In this example, a new mode, Mode 2-2B (an enhanced mode for the Mode 2-2) is defined, in which the locations of the preferred M sub-bands in the Set S, the sub-band PMIs for the M sub-bands, the sub-band CQIs for the individual codewords in each of the M sub-bands, the broadband PMI of the Set S, the broadband CQIs of the individual codewords in the Set S and possibly the RI information are fed back.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding non-periodic feedback mode is the newly defined Mode 2-2B.

The Set S consisting of the carriers #1 and #2 has in total 24 sub-bands. The value of M is set to be associated with the number of sub-bands contained in the Set S. In this example, M is set to be 8. Thus, in the Mode 2-2B, it is required to feed back the locations of the preferred 8 sub-bands, the sub-band PMIs (including W1 and W2) for the 8 sub-bands, the sub-band CQIs for the individual codewords in each of the 8 sub-bands as calculated from the sub-band PMIs, the broadband PMI (including W1 and W2) of the Set S, the broadband CQIs of the individual codewords in the Set S and possibly the RI information.

In order to reduce the feedback overhead, in this example, the sub-band PMIs are differentially coded with respect to the broadband PMI. The rule of the differential coding depends on a differential coding table pre-agreed between the BS and the UE. Table 4 is an example of such a differential coding table for sub-band PMI. It is to be noted that the 2-bit differential coding as shown in Table 4 is exemplary only. The implementation of the present invention is not limited to the coding of Table 3. In fact, a 1-bit or 3-bit differential coding is also feasible. The implementation of the 1-bit differential coding is the same as the one shown in this example and its description is thus omitted here. It is to be noted that Table 4 is applicable to both W2 and W1. In this example, the implementation of the differential coding of sub-band PMIs is explained taking W2 as an example. However, by reading this embodiment, those skilled in the art can readily understand the implementation for differential coding of W1 and any other sub-band PMIs.

TABLE 4

Differential Coding Table for Sub-band PMI

| Broadband PMI | Differentially Coded Sub-band PMI (2-bit) | | | |
|---|---|---|---|---|
| | 00 | 01 | 10 | 11 |
| 1 | 1 | 2 | 3 | 4 |
| 2 | 2 | 3 | 4 | 5 |
| 3 | 3 | 4 | 5 | 6 |
| 4 | 4 | 5 | 6 | 7 |
| 5 | 5 | 6 | 7 | 8 |
| 6 | 6 | 7 | 8 | 9 |
| 7 | 7 | 8 | 9 | 10 |
| 8 | 8 | 9 | 10 | 11 |
| 9 | 9 | 10 | 11 | 12 |
| 10 | 10 | 11 | 12 | 13 |
| 11 | 11 | 12 | 13 | 14 |
| 12 | 12 | 13 | 14 | 15 |
| 13 | 13 | 14 | 15 | 16 |
| 14 | 14 | 15 | 16 | 1 |
| 15 | 15 | 16 | 1 | 2 |
| 16 | 16 | 1 | 2 | 3 |

According to Table 4, it is assumed that the broadband PMI (W2) for the Set S is 12. In this case, it is only possible for the sub-band PMIs (W2) of the 8 sub-bands to take one of the four values: 12(00), 13(01), 14(10) and 15(11). Thus, the total overhead is 4 bits (broadband PMI)+8*2 bits (narrowband PMI)=20 bits.

EXAMPLE 13(b)

A new feedback mode is proposed to enhance the non-periodic feedback (feedback for PUSCH).

In this example, a new mode, Mode 2-2B (an enhanced mode for the Mode 2-2) is defined, in which the locations of the preferred M sub-bands in the Set S, the sub-band PMIs for the M sub-bands, the sub-band CQIs for the individual codewords in each of the M sub-bands, the broadband PMI of the Set S, the broadband CQIs of the individual codewords in the Set S and possibly the RI information are fed back.

The above Exemplary Scenario (b) is assumed in this example. According to the 3GPP document TS36.213 V9.1.0, "Physical layer procedures", the transmission approach for the carrier #2 is assumed to be "4) closed-loop space division multiplexing" and the corresponding non-periodic feedback mode is the newly defined Mode 2-2B.

The Set S consisting of the carrier #2 has in total 12 sub-bands. The value of M is set to be associated with the number of sub-bands contained in the Set S. In this example, M is set to be 4. Thus, in the Mode 2-2B, it is required to feed back the locations of the preferred 4 sub-bands, the sub-band PMIs (including W1 and W2) for the 4 sub-bands, the sub-band CQIs for the individual codewords in each of the 4 sub-bands as calculated from the sub-band PMIs, the broadband PMI (including W1 and W2) of the Set S, the broadband CQIs of the individual codewords in the Set S and possibly the RI information.

In order to reduce the feedback overhead, in this example, the sub-band PMIs are differentially coded with respect to the broadband PMI. The rule of the differential coding depends on a differential coding table pre-agreed between the BS and the UE. Table 4 is an example of such a differential coding table for sub-band PMI. It is to be noted that the 2-bit differential coding as shown in Table 4 is exemplary only. The implementation of the present invention is not limited to the coding of Table 3. In fact, a 1-bit or 3-bit differential coding is also feasible. The implementation of the 1-bit differential coding is the same as the one shown in this example and its description is thus omitted here. It is to be noted that Table 4 is applicable to both W2 and W1. In this example, the implementation of the differential coding of sub-band PMIs is explained taking W1 as an example. However, by reading this embodiment, those skilled in the art can readily understand the implementation for differential coding of W1 and any other sub-band PMIs.

According to Table 4, it is assumed that the broadband PMI (W2) for the Set S is 12. In this case, it is only possible for the sub-band PMIs (W2) of the 4 sub-bands to take one of the four values: 12(00), 13(01), 14(10) and 15(11). Thus, the total overhead is 4 bits (broadband PMI)+4*2 bits (narrowband PMI)=12 bits.

EXAMPLE 14(a)

A new feedback mode is proposed to enhance the non-periodic feedback (feedback for PUSCH).

In this example, a new mode, Mode 3-2 is defined, in which the sub-band PMIs for the individual sub-bands in the Set S, the CQIs for the individual codewords in each of the sub-bands in the Set S, the broadband CQIs of the individual codewords in the Set S, the broadband PMI of the Set S and possibly the RI information are fed back.

The above Exemplary Scenario (a) is assumed in this example. According to the 3GPP document TS36.213 V9.1.0, "Physical layer procedures", the transmission approach for the carriers #1 and #2 is assumed to be "8) two-layer beam forming transmission with PMI/RI feedback" and the corresponding non-periodic feedback mode is the newly defined Mode 3-2.

The Set S consisting of the carriers #1 and #2 has in total 24 sub-bands. Thus, in the new Mode 3-2, it is required to feed back the sub-band PMIs (including W1 and W2) for all the 24 sub-bands, the CQIs for the individual codewords in each of the 24 sub-bands as calculated from the sub-band PMIs, the broadband CQIs of the individual codewords in the Set S, the broadband PMI (including W1 and W2) of the Set S and possibly the RI information are fed back.

In order to reduce the feedback overhead, in this example, the sub-band PMIs are differentially coded with respect to the broadband PMI. The rule of the differential coding depends on a differential coding table pre-agreed between the BS and the UE. Table 4 is an example of such a differential coding table for sub-band PMI. It is to be noted that the 2-bit differential coding as shown in Table 4 is exemplary only. The implementation of the present invention is not limited to the coding of Table 3. In fact, a 1-bit or 3-bit differential coding is also feasible. The implementation of the 1-bit differential coding is the same as the one shown in this example and its description is thus omitted here. It is to be noted that Table 4 is applicable to both W2 and W1. In this example, the implementation of the differential coding of sub-band PMIs is explained taking W2 as an example. However, by reading this embodiment, those skilled in the art can readily understand the implementation for differential coding of W1 and any other sub-band PMIs.

According to Table 4, it is assumed that the broadband PMI (W2) for the Set S is 7. In this case, it is only possible for the sub-band PMIs (W2) of the 24 sub-bands to take one of the four values: 7(00), 8(01), 9(10) and 10(11). Thus, the total overhead is 4 bits (broadband PMI)+24*2 bits (narrowband PMI)=52 bits.

EXAMPLE 14(b)

A new feedback mode is proposed to enhance the non-periodic feedback (feedback for PUSCH).

In this example, a new mode, Mode 3-2 is defined, in which the sub-band PMIs for the individual sub-bands in the Set S, the CQIs for the individual codewords in each of the sub-bands in the Set S, the broadband CQIs of the individual codewords in the Set S, the broadband PMI of the Set S and possibly the RI information are fed back.

The above Exemplary Scenario (b) is assumed in this example. According to the 3GPP document TS36.213 V9.1.0, "Physical layer procedures", the transmission approach for the carrier #2 is assumed to be "4) closed-loop space division multiplexing" and the corresponding non-periodic feedback mode is the newly defined Mode 3-2.

The Set S consisting of the carrier #2 has in total 12 sub-bands. Thus, in the Mode 3-2, it is required to feed back the sub-band PMIs (including W1 and W2) for all the 12 sub-bands, the CQIs for the individual codewords in each of the 12 sub-bands as calculated from the sub-band PMIs, the broadband CQIs of the individual codewords in the Set S, the broadband PMI (including W1 and W2) of the Set S and possibly the RI information are fed back.

In order to reduce the feedback overhead, in this example, the sub-band PMIs are differentially coded with respect to the broadband PMI. The rule of the differential coding depends on a differential coding table pre-agreed between the BS and the UE. Table 4 is an example of such a differential coding table for sub-band PMI. It is to be noted that the 2-bit differential coding as shown in Table 4 is exemplary only. The implementation of the present invention is not limited to the coding of Table 3. In fact, a 1-bit or 3-bit differential coding is also feasible. The implementation of the 1-bit differential coding is the same as the one shown in this example and its description is thus omitted here. It is to be noted that Table 4 is applicable to both W2 and W1. In this example, the implementation of the differential coding of sub-band PMIs is explained taking W2 as an example. However, by reading this embodiment, those skilled in the art can readily understand the implementation for differential coding of W1 and any other sub-band PMIs.

According to Table 4, it is assumed that the broadband PMI (W2) for the Set S is 7. In this case, it is only possible for the sub-band PMIs (W2) of the 12 sub-bands to take one of the four values: 7(00), 8(01), 9(10) and 10(11). Thus, the total overhead is 4 bits (broadband PMI)+12*2 bits (narrowband PMI)=28 bits.

A number of examples have been illustrated in the above description. While the inventor has tried to list the examples in association with each other, it does not imply that it is required for the listed examples to have such correspondence as described. A number of solutions can be achieved by selecting examples having no correspondence as long as the conditions underlying the selected examples do not conflict with each other. Such solutions are encompassed by the scope of the present invention.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:

1. A user equipment (UE) configured for Channel State Information (CSI) feedback, the user equipment comprising:
   a transmitter configured to periodically transmit, using a physical uplink control channel, a CSI of a CSI feedback prioritized among a plurality of CSI feedbacks in case of collision of the plurality of CSI feedbacks in a sub-frame, wherein
   in case of collision of the plurality of CSI feedbacks of different downlink carrier components in the sub-frame, the CSI feedback is prioritized on the basis of the types of the plurality of CSI feedbacks among the different downlink carrier components, the types of the plurality of CSI feedbacks including a type of a CSI feedback not having a Channel Quality Index (CQI) but having a first Pre-coding Matrix Index (PMI) from among two PMIs and a type of a CSI feedback having a Rank Index (RI), the type of the CSI feedback not having the CQI but having the first PMI and the type of the CSI feedback having the RI each being a type always having a higher priority than all other types of CSI feedback among the plurality of CSI feedbacks.

2. The user equipment (UE) according to claim 1, wherein the transmitter is configured not to transmit a CSI with a lower priority on the basis of the types of the plurality of CSI feedbacks in a case where the plurality of the CSI feedbacks include different types.

3. The user equipment (UE) according to claim 1, wherein
   in case of collision of the plurality of CSI feedbacks of a same downlink carrier component in the sub-frame, the CSI feedback is prioritized on the basis of types of the plurality of CSI feedbacks in the same downlink carrier component,
   in case of collision of the plurality of CSI feedbacks of different downlink carrier components in the sub-frame, the CSI feedback is prioritized on the basis of (a) the types of the plurality of CSI feedbacks among the different downlink carrier components and (b) an index identifying a downlink carrier associated with each of the plurality of CSI feedbacks, and the transmitter is configured not to transmit a CSI with lower priority on the basis of the index identifying a downlink carrier component associated with each of the plurality of CSI feedbacks in a case where the plurality of the CSI feedbacks include CSI feedbacks corresponding to different downlink carrier components.

4. The user equipment (UE) according to claim 1, wherein the type is associated with the feedback mode.

5. The user equipment (UE) according to claim 1, wherein the types of the plurality of CSI feedbacks include a type of a CSI feedback having the CQI, and the type of the CSI feedback not having the CQI but having the first PMI and the type of the CSI feedback having the RI each being a type always having a higher priority than the type of the CSI feedback having the CQI.

6. A method of Channel State Information (CSI) feedback, comprising:

periodically transmitting, using a physical uplink control channel, a CSI of a CSI feedback prioritized among a plurality of CSI feedbacks in case of collision of the plurality of CSI feedbacks in a sub-frame, wherein in case of collision of the plurality of CSI feedbacks of different downlink carrier components in the sub-frame, the CSI feedback is prioritized on the basis of the types of the plurality of CSI feedbacks among the different downlink carrier components, the types of the plurality of CSI feedbacks including a type of a CSI feedback not having a Channel Quality Index (CQI) but having a first Pre-coding Matrix Index (PMI) from among two PMIs and a type of a CSI feedback having a Rank Index (RI), the type of the CSI feedback not having the CQI but having the first PMI and the type of the CSI feedback having the RI each being a type always having a higher priority than all other types of CSI feedback among the plurality of CSI feedbacks.

7. The method of CSI feedback according to claim 6, further comprising:

not transmitting a CSI with a lower priority on the basis of the types of the plurality of CSI feedbacks in a case where the plurality of the CSI feedbacks include different types.

8. The method of CSI feedback according to claim 6, wherein in case of collision of the plurality of CSI feedbacks of a same downlink carrier component in the sub-frame, the CSI feedback is prioritized on the basis of types of the plurality of CSI feedbacks in the same downlink carrier component, and in case of collision of the plurality of CSI feedbacks of different downlink carrier components in the sub-frame, the CSI feedback is prioritized on the basis of (a) the types of the plurality of CSI feedbacks among the different downlink carrier components and (b) an index identifying a downlink carrier associated with each of the plurality of CSI feedbacks, the method further comprising:

not transmitting a CSI with lower priority on the basis of the index identifying a downlink carrier component associated with each of the plurality of CSI feedbacks in a case where the plurality of the CSI feedbacks include CSI feedbacks corresponding to different downlink carrier components.

9. The method of CSI feedback according to claim 6, wherein a plurality of pieces of RI information is transmitted within one sub-frame after being subjected to a joint coding process.

10. The method of CSI feedback according to claim 9, wherein the joint coding process is an inter-mode differential coding process in which, with respect to the RI of a specified feedback mode as a reference, the RIs of the other feedback modes are differentially coded.

11. The method of CSI feedback according to claim 9, wherein the joint coding process is an inter-carrier differential coding process in which, with respect to the RI of the feedback mode for a specified carrier as a reference, the RIs of the other feedback modes are differentially coded.

12. The method of CSI feedback according to claim 6, wherein a plurality of pieces of broadband Channel Quality Index (CQI) information is transmitted within one sub-frame after being subjected to a joint coding process.

13. The method of CSI feedback according to claim 12, wherein the joint coding process is an inter-carrier differential coding process in which, with respect to the CQI of the feedback mode for a specified carrier as a reference, the CQIs of the other feedback modes are differentially coded.

14. The method of CSI feedback according to claim 6, wherein a plurality of types is concatenated for transmission, without any coding process.

15. The method of CSI feedback according to claim 6, wherein a plurality of types is transmitted within one sub-frame after being subjected to a joint coding process.

16. The method of CSI feedback according to claim 6, wherein the type is associated with the feedback mode.

17. The method of CSI feedback according to claim 6, wherein the types of the plurality of CSI feedbacks include a type of a CSI feedback having the CQI, and the type of the CSI feedback not having the CQI but having the first PMI and the type of the CSI feedback having the RI each being a type always having a higher priority than the type of the CSI feedback having the CQI.

* * * * *